US006099607A

United States Patent [19]

Haslebacher

[11] Patent Number: 6,099,607

[45] Date of Patent: Aug. 8, 2000

[54] ROLLABLY POSITIONED, ADJUSTABLY DIRECTABLE CLEAN AIR DELIVERY SUPPLY ASSEMBLY, FOR USE IN WEATHER PROTECTED ENVIRONMENTS TO PROVIDE LOCALIZED CLEAN AIR, WHERE ACTIVITIES REQUIRE CLEAN AIR QUALITY PER STRICT SPECIFICATIONS

[76] Inventor: William J. Haslebacher, 13704 SE. 17th St., Bellevue, Wash. 98005

[21] Appl. No.: 09/120,593

[22] Filed: Jul. 22, 1998

[51] Int. Cl.[7] .......................... B01D 35/30; B01D 39/16

[52] U.S. Cl. .......................... 55/356; 55/385.2; 55/472; 55/473; 55/482; 55/501; 55/502; 55/504

[58] Field of Search .......................... 55/356, 385.2, 55/467, 471, 472, 473, 482, 501, 502, 504

[56] References Cited

U.S. PATENT DOCUMENTS

| | | | |
|---|---|---|---|
| 3,820,536 | 6/1974 | Anspach, Jr. et al. | 128/132 |
| 3,861,894 | 1/1975 | Marsh | 55/316 |
| 3,935,803 | 2/1976 | Bush | 98/36 |
| 4,202,676 | 5/1980 | Pelosi | 55/269 |
| 4,252,054 | 2/1981 | Bakels | 98/115 R |
| 4,512,245 | 4/1985 | Goldman | 98/115.4 |
| 4,531,956 | 7/1985 | Howorth | 55/279 |
| 4,560,395 | 12/1985 | Davis | 55/276 |
| 4,563,943 | 1/1986 | Bertelsen | 98/115.1 |
| 4,629,482 | 12/1986 | Davis | 55/385 |
| 4,670,223 | 6/1987 | Delachapelle | 422/122 |
| 4,701,195 | 10/1987 | Rosendall | 55/473 |
| 4,732,592 | 3/1988 | Spengler | 55/356 |
| 4,737,173 | 4/1988 | Kudirka et al. | 55/276 |
| 4,778,496 | 10/1988 | Conrad | 55/472 |
| 4,810,269 | 3/1989 | Stackhouse et al. | 55/267 |
| 4,838,910 | 6/1989 | Stollenwerk et al. | 55/385.2 |
| 4,850,268 | 7/1989 | Aoyama | 98/33.1 |
| 5,078,764 | 1/1992 | Lutterbach et al. | 55/356 |
| 5,082,476 | 1/1992 | Kahlbaugh et al. | 55/97 |
| 5,133,788 | 7/1992 | Backus | 55/467 |
| 5,152,814 | 10/1992 | Nelson | 55/270 |
| 5,185,015 | 2/1993 | Searle | 55/102 |
| 5,192,342 | 3/1993 | Baron et al. | 55/97 |
| 5,240,478 | 8/1993 | Messina | 95/273 |
| 5,290,330 | 3/1994 | Tepper et al. | 55/276 |
| 5,290,331 | 3/1994 | Miles et al. | 55/321 |
| 5,312,465 | 5/1994 | Riutta | 55/320 |
| 5,358,443 | 10/1994 | Mitchell et al. | 454/230 |
| 5,487,766 | 1/1996 | Vannier | 55/385.1 |

OTHER PUBLICATIONS

Product Brochure Regarding Clas 10 Portable Clean Air Station.

*Primary Examiner*—David A. Simmons
*Assistant Examiner*—Robert A. Hopkins
*Attorney, Agent, or Firm*—Roy E. Mattern, Jr.

[57] ABSTRACT

An adjustably directable clean air delivery supply assembly which provides clean air for use in weather protected environments. This assembly is, doorway passable and rollably positioned, to be utilized where activities require very clean air per strict specifications. When located, the device can quickly be unfolded and positioned for operation to produce clean air in the desired direction at minimal-eddy producing airflow. Surrounding unfiltered air is drawn in just above floor level through a pre-filter into a airtight lower hollow housing, which contains an interior powered air moving assembly, and discharged upwardly into the tower hollow housing which is supported on top of the lower hollow housing. Secured to the tower hollow housing is an adjustable telescoping height and rotatable positioning structural tube, which receives and directs the air upwardly through a self-sealing bellows into the top final filter hood assembly. The bellows encapsulates a fully adjustable, interconnecting, angularly adjustable, positioning hinge. The pre-filtered air then passes through a final filter such as a high efficiency particle arrestor type air filter. The final filtered air then is discharged in a desired direction at a selected volume into a shrouded or unshrouded area. The top final filter hood assembly is movable through one hundred eighty degrees of vertical arc, horizontally rotatable, and can be raised or lowered for operation, or folded against the lower hollow housing for storage. This self-contained clean air supply assembly can be transported, adjusted, and reused without recertification testing, when it is handled and operated properly.

57 Claims, 19 Drawing Sheets

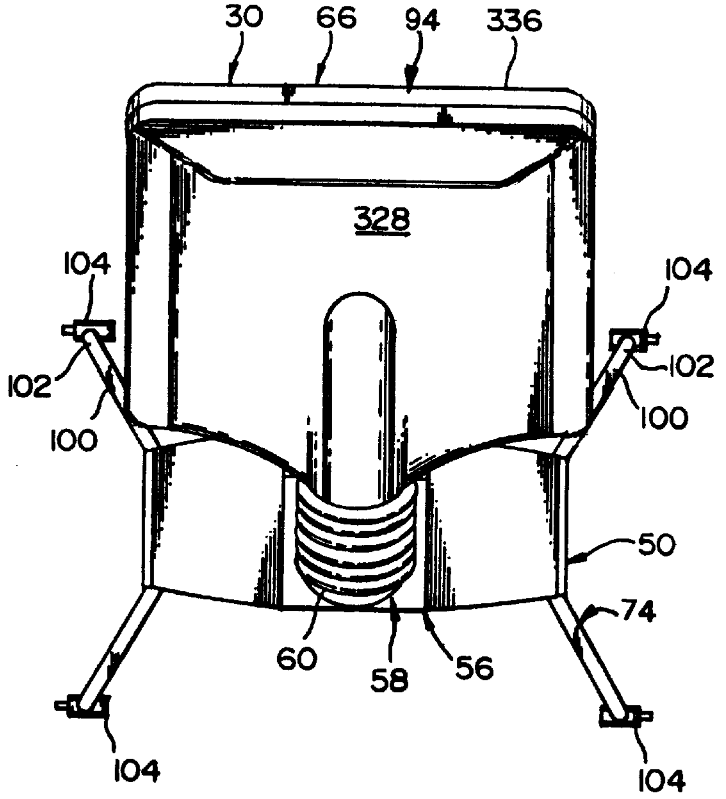
FIG. 5
FIG. 6
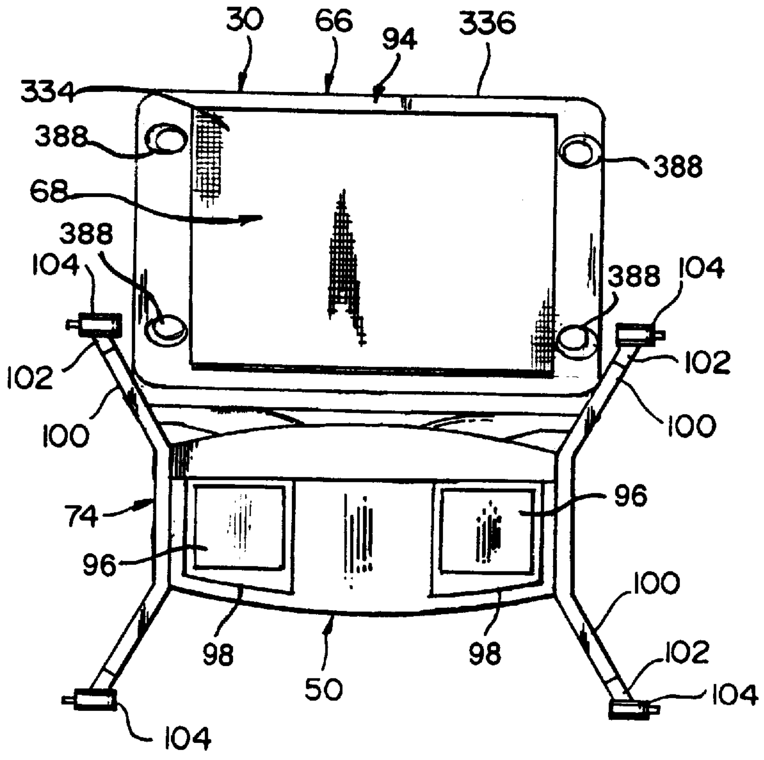

FIG. 12A
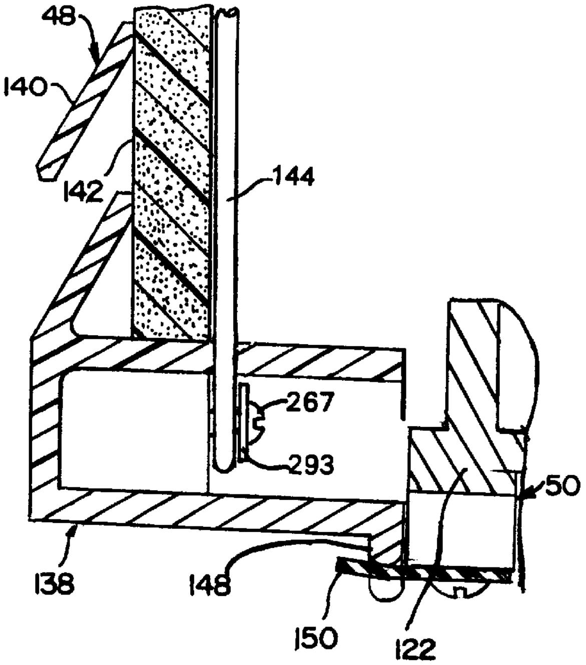
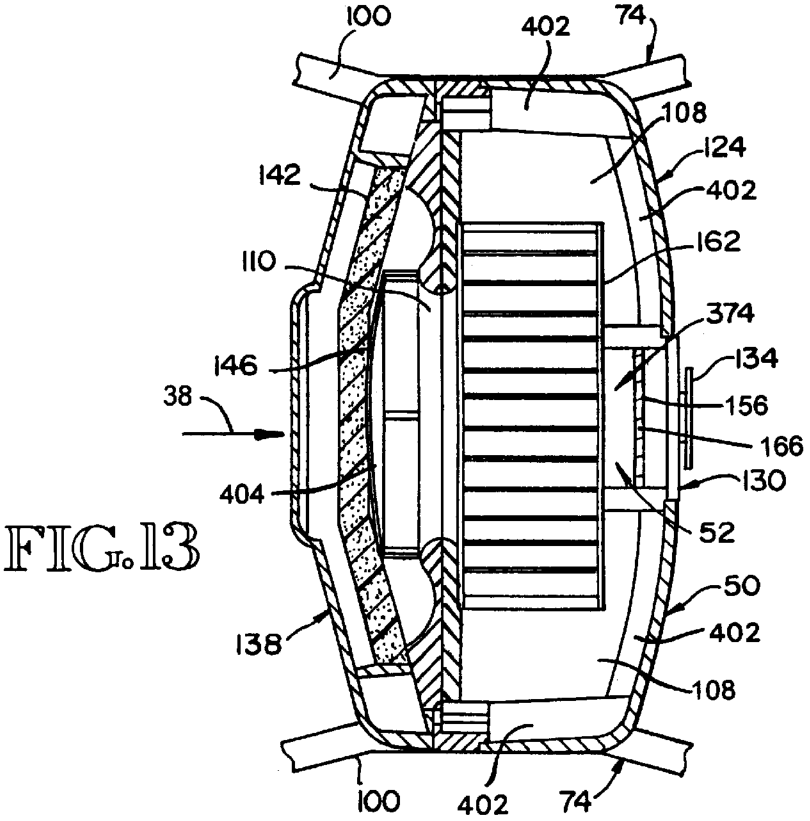
FIG. 13

FIG. 15
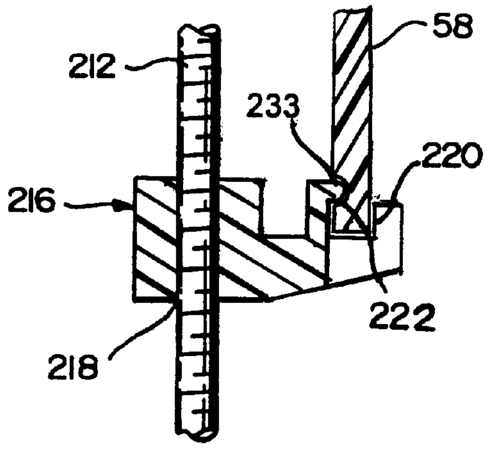
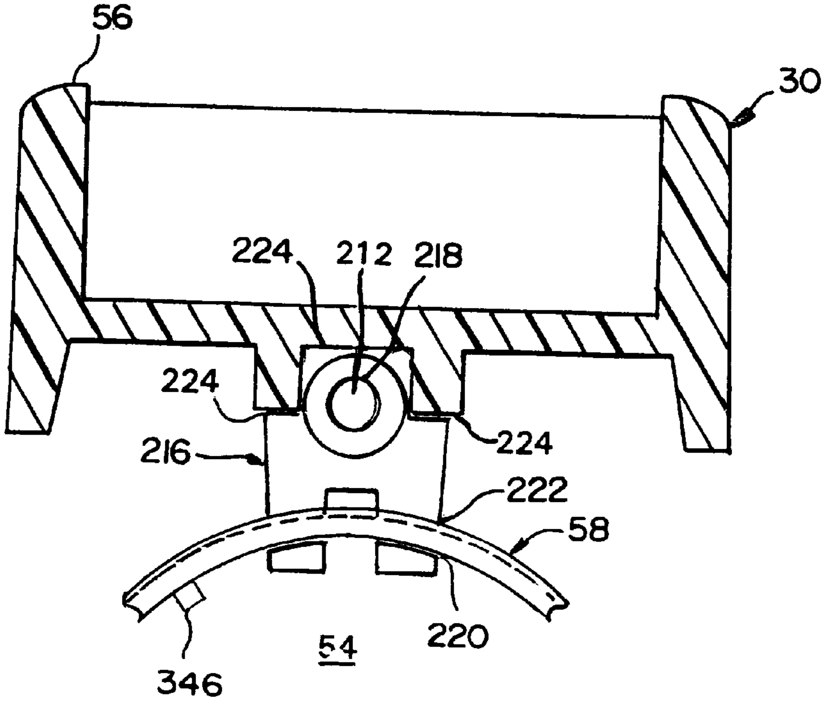
FIG. 16

ROLLABLY POSITIONED, ADJUSTABLY DIRECTABLE CLEAN AIR DELIVERY SUPPLY ASSEMBLY, FOR USE IN WEATHER PROTECTED ENVIRONMENTS TO PROVIDE LOCALIZED CLEAN AIR, WHERE ACTIVITIES REQUIRE CLEAN AIR QUALITY PER STRICT SPECIFICATIONS

BACKGROUND

Clean air per specifications is needed in areas and volumes where the activities undertaken will not be assuredly successful, unless clean air meeting certain specifications is the only air passing through the volume or locale where the activity is being undertaken. Many types of equipment are offered in the marketplace and are disclosed in patents and publications, which supply clean air to meet various specifications. Some of these types are portable for convenient use at a specific locale where clean air is needed, and often the locale is designated as an ultra clean air zone.

In respect to equipment illustrated and described in U.S. Patents:

In 1974, Messrs. Anspach Jr. and Bakels in their U.S. Pat. No. 3,820,536, disclosed their portable apparatus for providing clean air at a surgical area. Air from a nearby surrounding area was drawn in at the height of an operating table, then filtered, and thereafter discharged horizontally over the operating table and past the patient. Sterile drapes were used to continue the direction of the clean air and to avoid the entry of non-filtered air into the stream of the filtered clean air;

In 1976, Louis Bush in his U.S. Pat. No. 3,935,803 described and illustrated his air filtration apparatus, which was portable, and at its place of use about a hospital bed, it directed a filtered stream of clean air downwardly over the entire bed. The surrounding room air entered just above floor level beyond the head of the bed, and then the air was filtered enroute upwardly to be discharged from a cantilevered plenum chamber positioned over the hospital bed;

In 1985, Frederick H. Howorth in his U.S. Pat. No. 4,531,956, disclosed his sterile air trolley, movable to a locale where sterile air was required. Surrounding air to be cleaned and sterilized was drawn in horizontally through filters, and then moved upwardly by a blower to enter a horizontal casing having many discharge openings, arranged in both vertical and horizontal planes. The principal quantity of the sterile air was directed downwardly through a volume or locale, where an activity was underway, which was being performed when surrounded by the downwardly flowing sterile air, which remained free of any contaminated ambient air;

In 1988, Charles W. Spengler in his U.S. Pat. No. 4,732,592 illustrated and described his portable clean air facility having a powered filtering unit to draw in surrounding air, and also to draw in air leaving the adjacent clean air volume surrounded by plastic sheeting draped over P.V.C. pipe framing, and then to discharge the filtered air downwardly through this adjacent clean air volume; and In 1994 Raine Riutta described and illustrated in U.S. Pat. No. 5,312,465 a filtration apparatus with bag-like plenum chamber, which is portable and collapsible for movement and storage, and then inflated, in part, when in use. Surrounding air is drawn in just above floor level and then directed upwardly while being filtered. Thereafter, the filtered air enters the then inflated flexible bag, serving as a plenum chamber, which extends first on a diagonal to a higher elevation, and then in a horizontal plane to position an outlet at the end of this inflated plenum chamber above a locale where clean air is needed. The filtered clean air is thereafter directed downwardly to and through the locale requiring the flow of clean air.

In respect to equipment available in the marketplace and set forth in published information, the model Clas 10 portable clean air station produced by the International Portland Corporation, is illustrated and described as a portable unit which draws surrounding air in just above floor level for entering a pre-filter. Thereafter the pre-filtered air is directed upwardly through an adjustable height vertical tube which, at its top, is connected to a fixed ninety degree elbow. Then this elbow is connected to a horizontal tube. At the extended end of this horizontal tube is an attached angular adjustment mechanism surrounded by a bellows, which is also secured to the horizontal tube. Both the angular adjustment mechanism and the bellows are also connected, at their other ends, to an adjustable head having a plenum and a HEPA filter. The pre-filtered air passes from the tubes, to pass by the angular adjustment mechanism, while being directed within the bellows. Then the pre-filtered air enters the plenum and passes through the HEPA filter to be discharged as clean air through the adjustable head, in a selected direction through a locale where flowing clean air is needed. This adjustable head is tiltable through ninety degrees, and by movement of this portable clean air station, it is positioned through three hundred and sixty degrees. The angular position of the adjustable head, when changed, requires the manipulation of an external locking and unlocking knob accessible on the outside top of the horizontal tube.

The arrangement of the model Clas 10 portable clean air station allows the pre-filtered air to enter the center of the filter plenum of the adjustable head. When the adjustable head is positioned horizontally, the clean air leaves in a downward vertical airflow, as this adjustable head is located at an extended distance from the vertical tube.

In respect to this extended distance, the bellows is located 1.5 times the width or size of the filter off of the centerline of the vertical tube. Therefore, when moving this Clas 10 portable clean air station, this unbalanced top heavy configuration requires very careful handling during the movements thereof. The adjustable head and the filter thereof are not sufficiently adjustable to be taken out of this unbalanced extended position during any movement of this Clas 10 portable clean air station. Although all these illustrated and described products are recognized for their merits and for their production of clean air and/or sterile air, which is directed through locales needing only the flow of such clean and/or sterile air, there remains several unfulfilled needs for portable equipment to supply and to conveniently deliver clean and/or sterile air.

SUMMARY

An improved portable clean air supply assembly is available for rolling through doorways and being easily stored in a comparatively limited space. Then, when needed, it is conveniently moved to a locale needing clean air. There it will produce a flow of clean air through a volume and area, without necessitating recertification testing for producing certifiable quality clean air, where an activity is being undertaken, which cannot be hindered by the presence of contamination. After being positioned at the selected locale, this clean air supply assembly is quickly adjusted into an operating configuration, which is one of many that might have been selected. A top filter head assembly, by adjustments of the components supporting it, is pivoted through selected vertical angles in a vertical plane; rotated either left or right, short of a full rotation in either direction in a horizontal plane; and either raised or lowered with respect to floor or ground level; and if needed, lights are turned on.

When in operation, this improved rollably portable clean air supply assembly draws surrounding air in horizontally above but near ground level through a front pre-filter assembly. The pre-filtered air is drawn in and through a lower hollow housing during operations of an interior powered air moving assembly centering on the rotation of a backward inclined impeller, which discharges the pre-filtered air upwardly.

Then a tower hollow housing supported on the lower hollow housing receives the pre-filtered air and directs it into an adjustable height telescoping structural tube, which is movably supported in the tower hollow housing, for left and right rotations, limited to less than a full revolution to avoid entanglement of circuit wires, and for up and down movement with the top thereof extendable to a six foot elevation.

A tilt adjustment assembly is secured to the top of the adjustable height telescoping structural tube, and also to the top filter head assembly, to controllably position the top filter head assembly to move and stop at selected locations, throughout a ninety degree rotation in a vertical plane. In addition, an adjustable cable and spring positioning subassembly is connected between the adjustable height telescoping structural tube and the top filter head assembly, whereby the top filter head assembly is rotatably moved through an additional ninety degrees, thereby completing a one hundred eighty degree arcuate movement of the top filter head assembly.

A bellows is sealably secured between the top filter head assembly and the adjustable height telescoping structural tube while surrounding the tilt adjustment assembly and portions of the adjustable cable and spring positioning subassembly, and providing an ample passageway for the pre-filtered air.

The top filter head assembly receives the pre-filtered air from the bellows through, in effect, a side entry thereof, that directs the flow of the pre-filtered air in a path that parallels the plane in which the final filter is located. This filter is called a high efficiency particle arrestor filter, also designated as a HEPA/ULPA filter. The HEPA/ULPA final filter is installed using preformed sealing gaskets. Preferably, baffles are arranged in the top filter head assembly to uniformly distribute the pre-filtered air through the HEPA filter. A grill protects the HEPA filter and helps to position it. Any build up of static electricity on or about this grill is avoided by grounding the grill.

The bottom rollable support assembly is arranged as close to floor level as possible for passing by and under obstructions, and lockable position swivel casters are used. Although the bottom rollable support assembly provides an excellent stable base, the lower hollow housing has a receiving volume into which selectable removable weights are placed. For example, when larger size top filter head assemblies are used, then counterweights are placed in the receiving volumes.

Various embodiments result in a selection of electrical and electronic components to provide controls and equipment: to provide a work area lighting system; to operate the interior powered air moving assembly, and to operate an electrical powered lift assembly to raise and to lower the adjustable height telescoping structural tube, which thereby raises and lowers the top filter head assembly.

Electrical controls are protectively covered for avoiding static shocks and well sealed for convenient cleaning by using liquid cleaners, and the entire clean air supply assembly is so assembled and shaped to be easily cleaned, and to avoid as much as possible the collection of dust.

When it is necessary to avoid currents of outside air which is not filtered and might interfere with filtered air, a clear plastic drape, also referred to as a curtain or shroud, is removably secured about the top filter head assembly. It is then arranged to direct the filtered air to and through the locale where the clean air, so specified, must flow, so an activity is carried on successfully, as contamination in any way is avoided.

Wherever possible, sound attenuating materials and structures are utilized, without interfering with the flow of the pre-filtered air through the respective plenums created in the interiors of the lower hollow housing, the tower hollow housing, the adjustable height telescoping structural tube, the bellows, and the top filter head assembly.

At any selected overall height adjustment, a clamping assembly is available to be tightened to maintain the selected height position. Also the adjustable height telescoping structural tube at the bottom thereof has a portion which interfits with a portion of the adjustable positioning subassembly, to thereby prevent the unwanted removal of this tube from surrounding portions of the tower hollow housing.

In respect to all the embodiments of this clean air supply assembly, a person utilizing a respective embodiment has many options of how he or she will arrange the components thereof; control the speed of the clean air supply; direct the clean air supply paths to, around, and past specific locales, where clean air and ultra clean air is required.

DRAWINGS OF PREFERRED EMBODIMENTS

Preferred embodiments of this improved, rollably positioned, passable through doorways, adjustably directed clean air supply assembly used in a room to direct clean air though a designated volume within the room are illustrated in the drawings, wherein:

FIG. 5 is a top view of the assembly, shown in FIG. 1.

FIG. 6 is a bottom view of the assembly, shown in FIG. 1.

Figure 12:
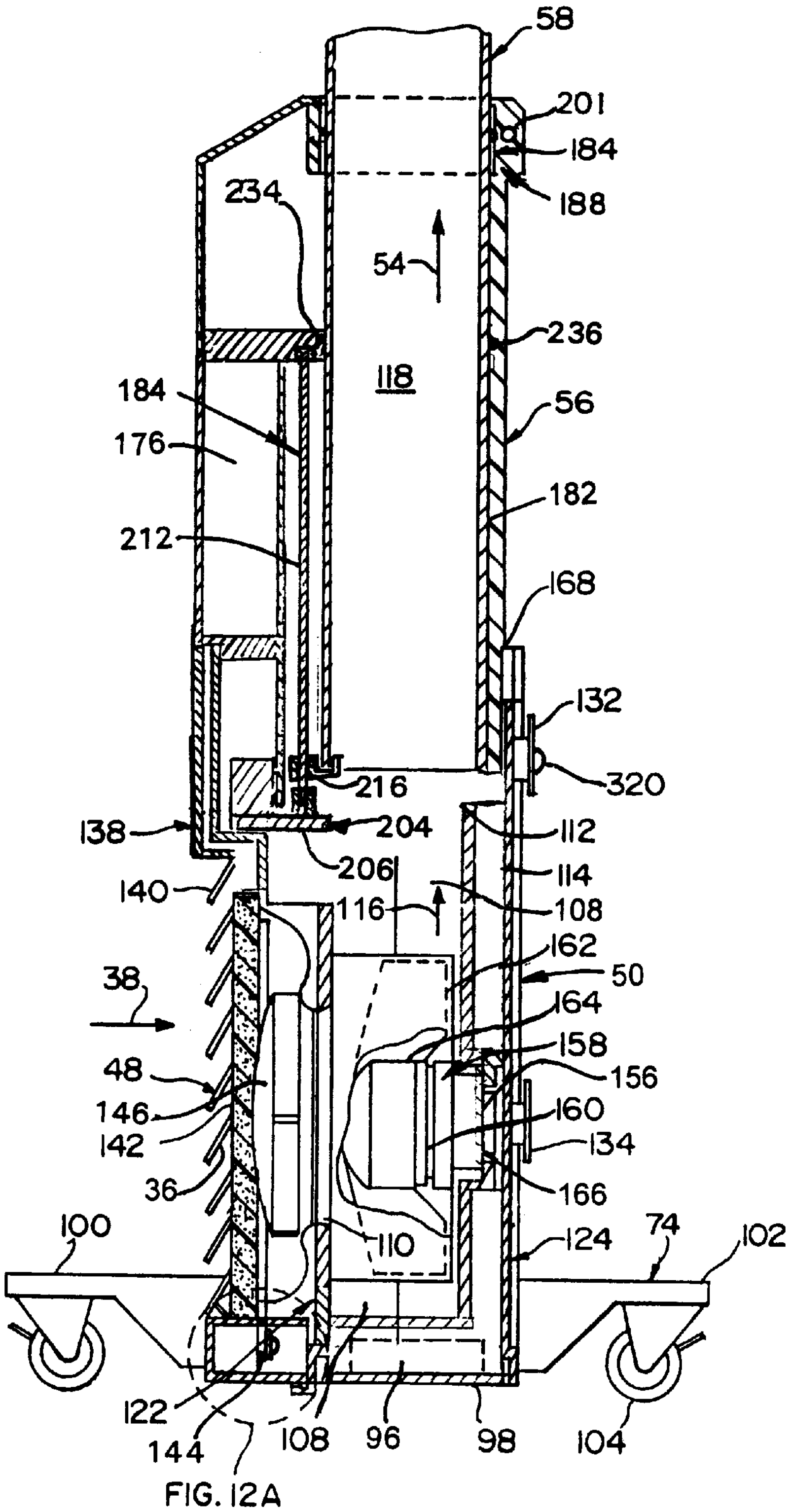

FIG. 12 is a vertical cross sectional view of the assembled lower housing, and the various components supported thereby; for example: the electric motor which drives the backward inclined impeller; the tower housings which extend down into it; charcoal pre-filter assembly inclusive of the baffle and door hereof; the legs and casters; the sound deadening materials; the power cord storage discs; the storage volume to receive selected counterweights and the weights so positioned, especially when large top filter hood assembly is being utilized.

FIG. 12A is an enlarged partial sectional view showing how the front pre-filter assembly, at the bottom thereof, is removably supported by the front portion of the lower hollow housing.

FIG. 13 is horizontal cross sectional view taken through the assembly lower housing and the various components supported thereby, one of which is the electric motor which drives the backward inclined impeller.

Figure 14:
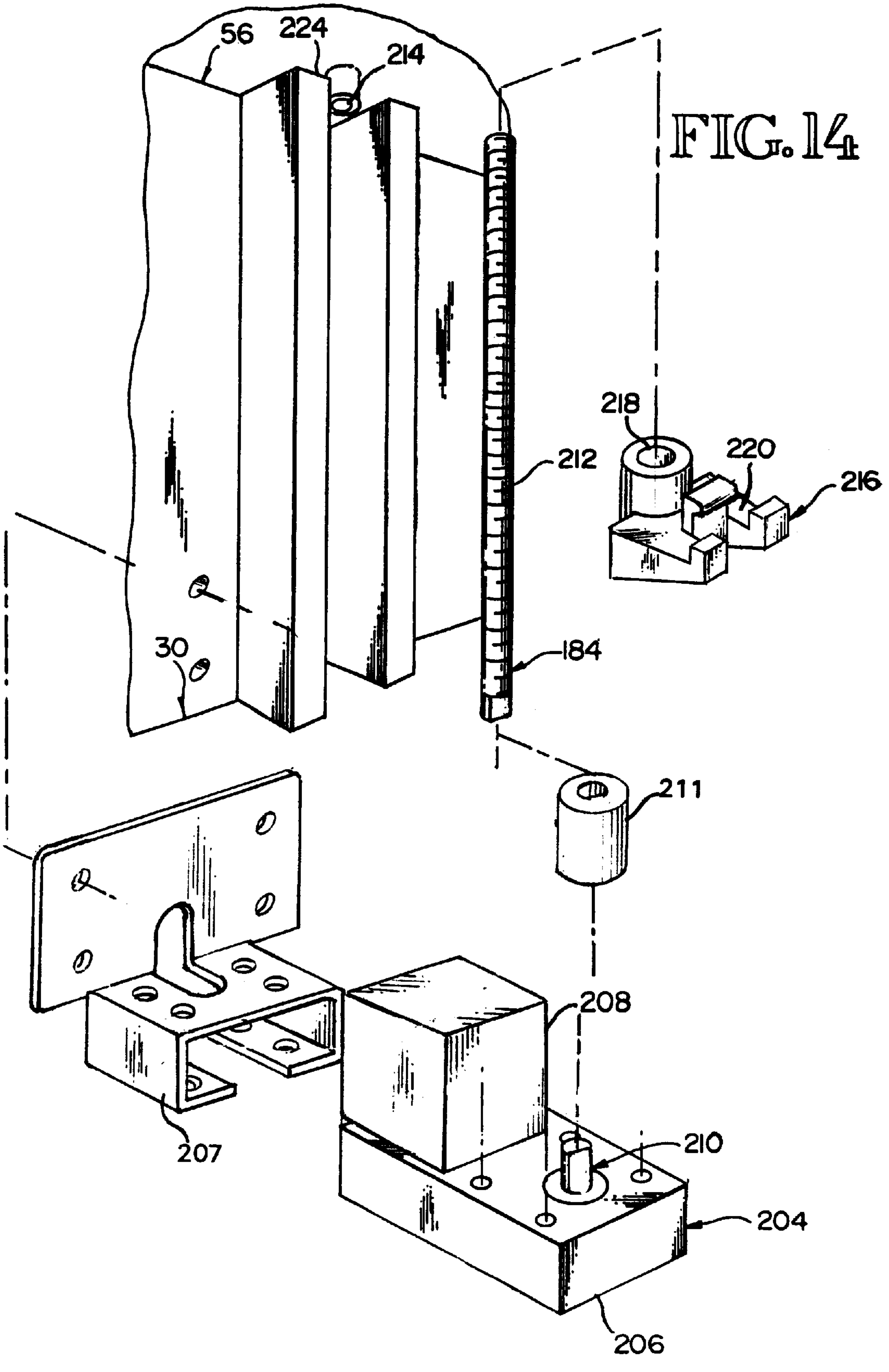

FIG. 14 is an exploded perspective view of the power assembly mounted in the tower hollow housing and utilized to raise and to lower the telescoping structural tube plenum, particularly showing: the electric motor and its rotating drive assembly; the lead screw which is rotated by this rotating drive assembly; the guide block inter-fitted with the lead screw and secured positively with the bottom of the telescoping structural tube plenum, whereby, as the guide block is moved up and down upon rotation of the lead screw, it in turn moves the telescoping structural tube plenum up and down, to thereby raise and lower the top filter hood assembly; the spaced guide rails which keep the guide block from rotating throughout the up and down travel thereof, along the lead screw.

FIG. 15 is a partial vertical cross sectional view of the guide block, mounted on the lead screw, and receiving and holding the lower grooved portion of the telescoping structural tube plenum.

FIG. 16 is a partial horizontal cross sectional view of the guide block mounted on the lead screw, guided by the guide rails, which preferable are integrally molded in the tower housing, with portions of this housing being shown, along with portions of the telescoping structural tube plenum including the rotational limit pin.

Figure 17:
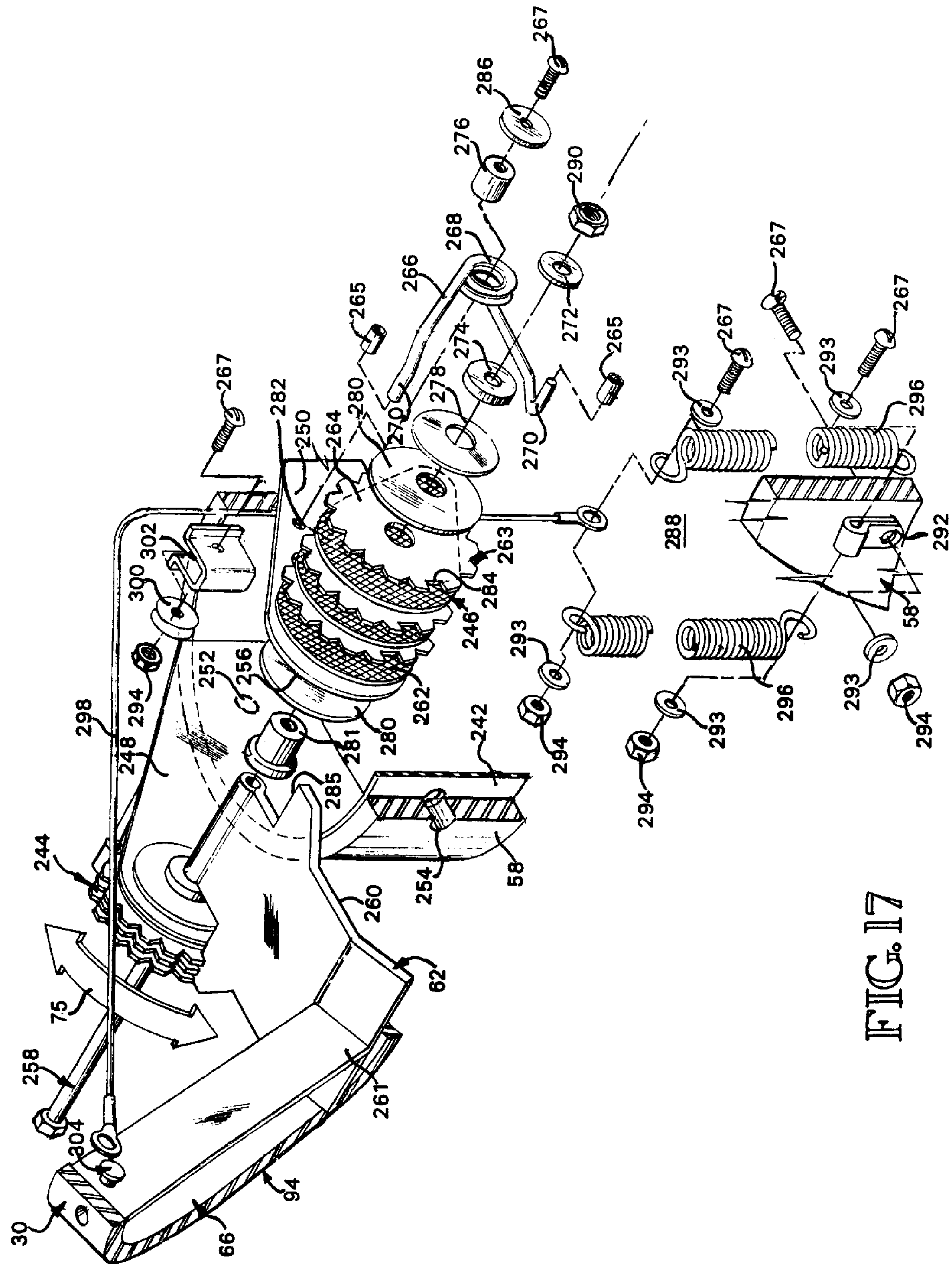

FIG. 17 is a partial exploded perspective view of the tilt adjustment assembly and the supplemental positioning assembly, which together tiltably support the top filter hood assembly onto the telescoping structural tube plenum assembly, with portions only being shown of each one.

Figure 18:
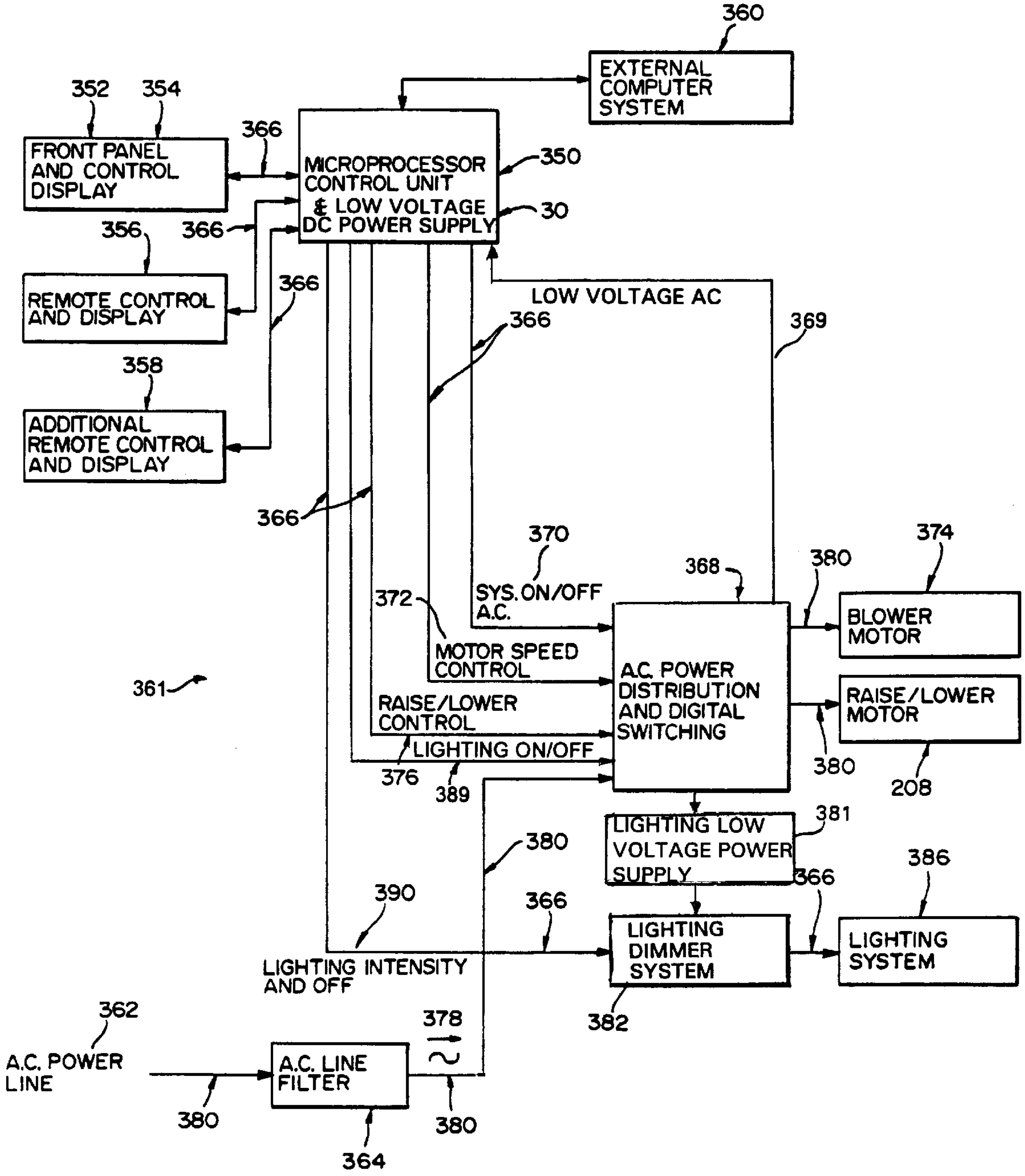

FIG. 18 is a block diagram of electrical and electronic components, with schematic indications of circuitry with respect to operational control assembly of this improved clean air supply assembly.

Figure 19:
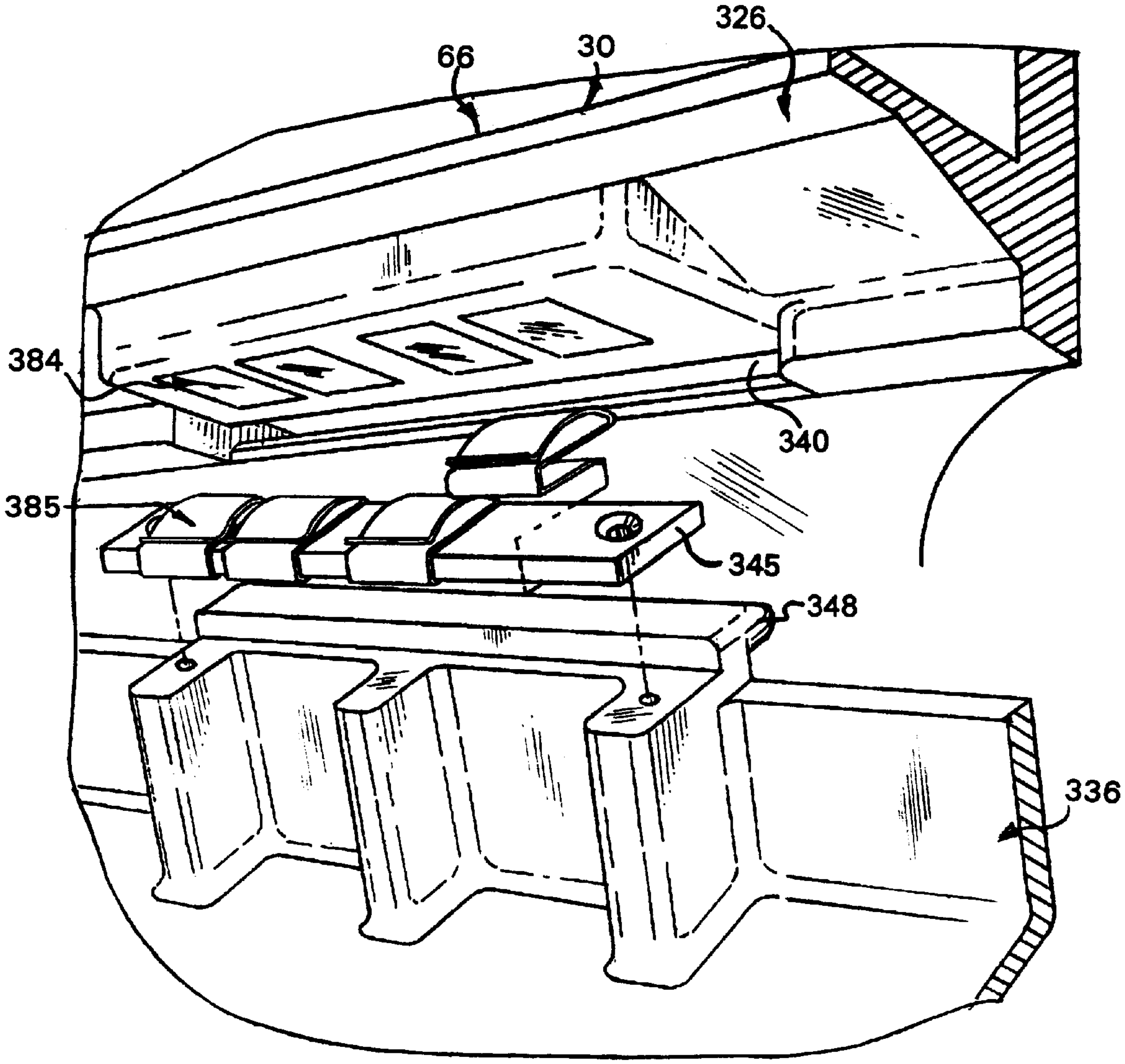

FIG. 19 is a exploded view of the electrical contacts incorporated in the hood bezel to upper filter hollow hood assembly to allow the removal of the bezel without the necessity of undoing the wiring connection.

Figure 20:
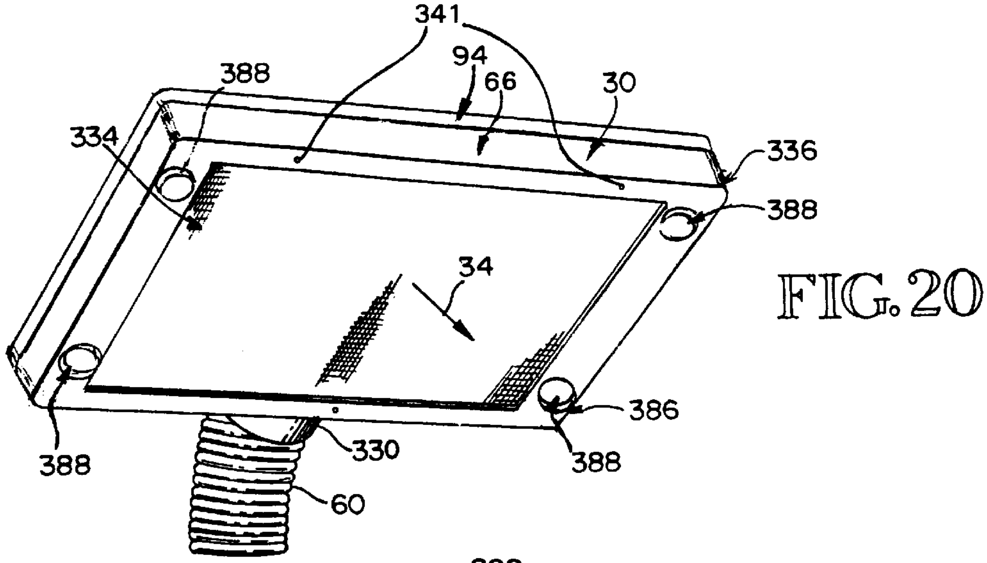

FIG. 20 is a front perspective of only the top portion of this clean air supply to show how a larger top filter hood assembly can be installed, which requires additional counterweight be positioned in the lower hollow housing, as shown in FIG. 12.

Figure 21:
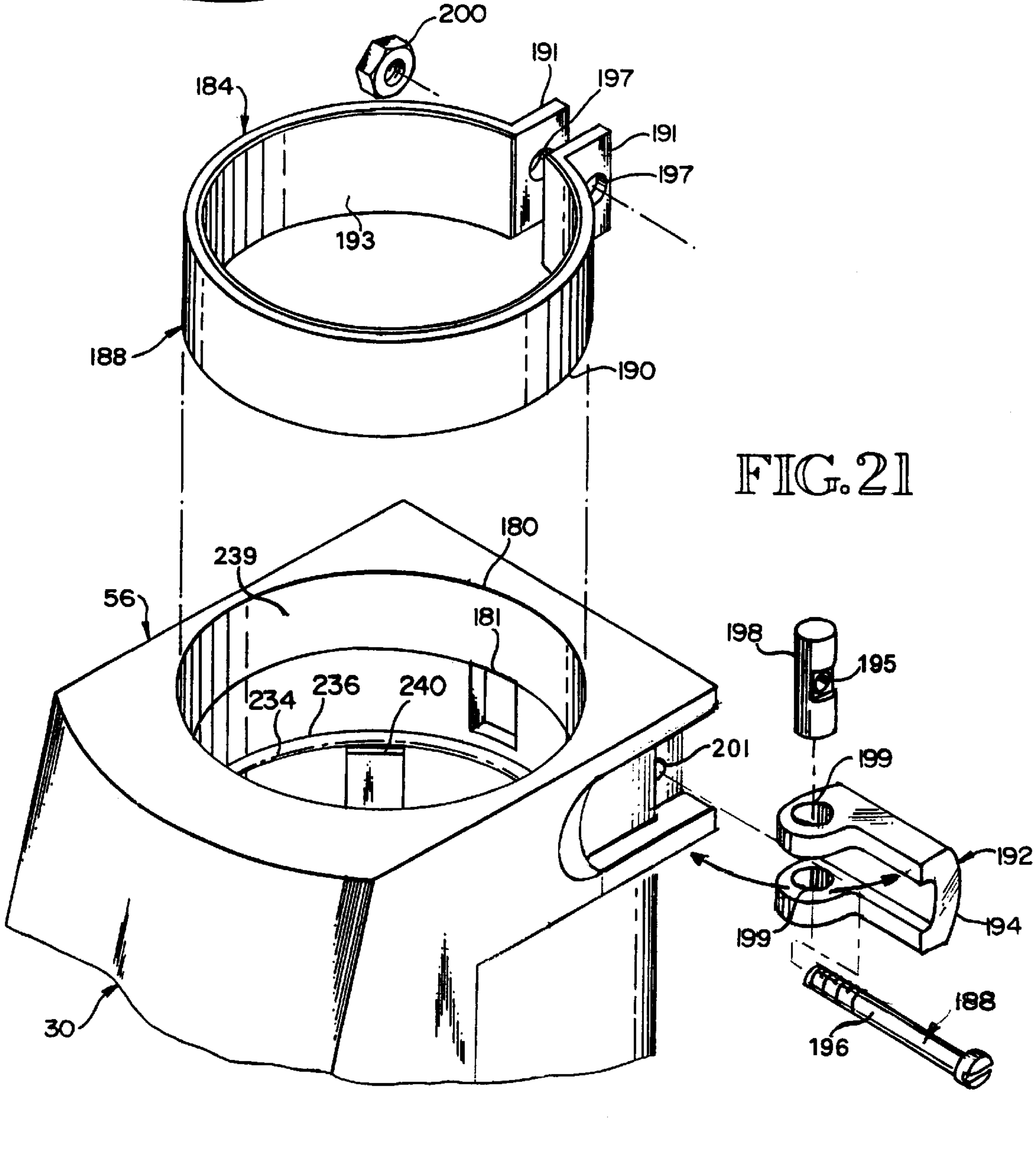

FIG. 21 is an exploded partial perspective view of the components of a adjustable hand actuated tube brake assembly which is used, when a power lift assembly is not used, and as a stabilizing clamp in the power lift mode to control the telescoping positioning of the telescoping structural tube plenum, and also showing the bearing strip material used on all embodiments.

Figure 22:
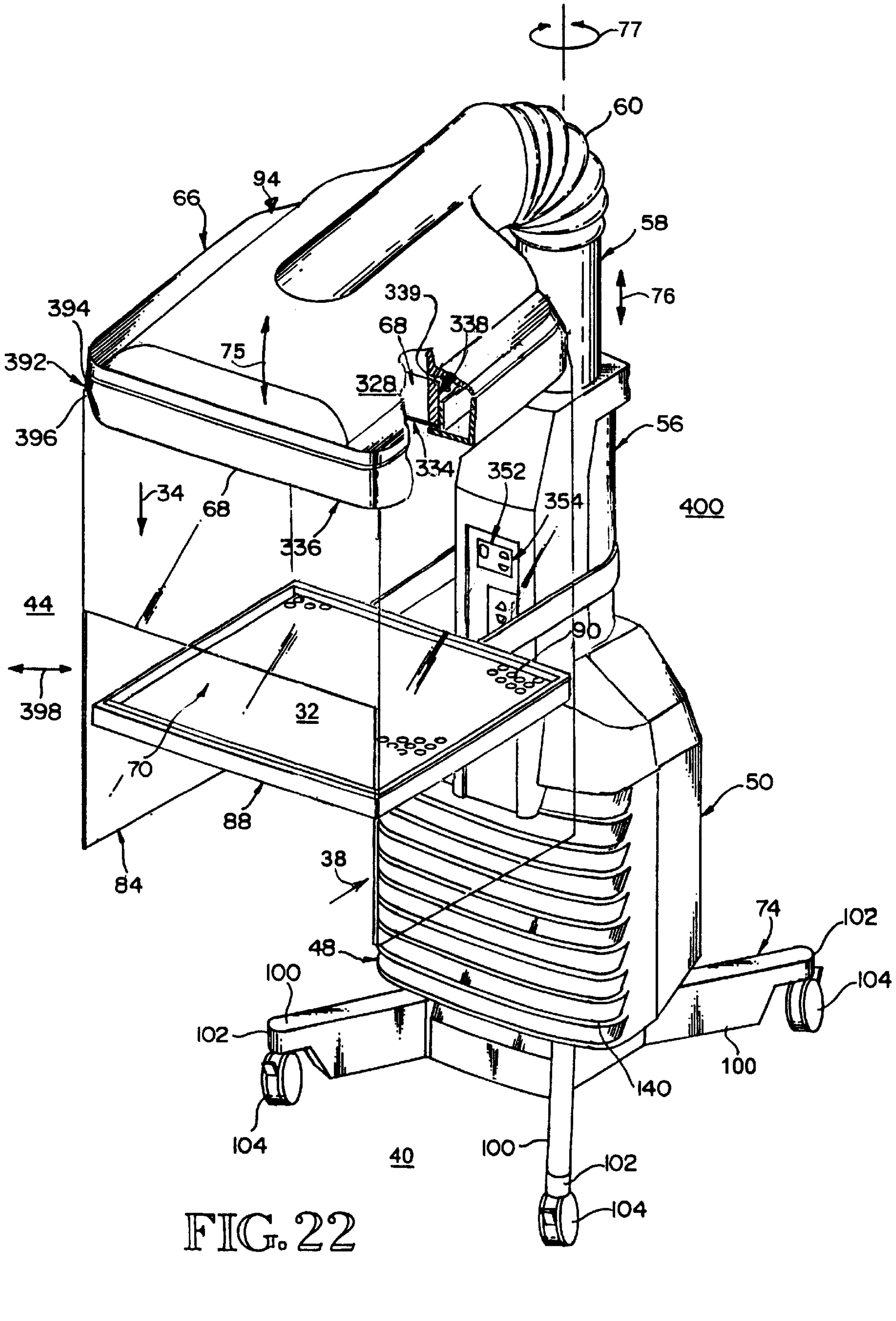

FIG. 22 is a perspective view of the clean air supply device, having a work tray supported on the telescoping structural tube plenum assembly, and having a air isolating plastic shroud, also referred to as a drape or curtain, secured around the top filter hood assembly and suspended down near floor level, to create a clean room like space or volume, under positive air pressure, wherein the work tray, hospital bed, or other device, is conveniently positioned to be bathed in clean air.

Figure 23A:
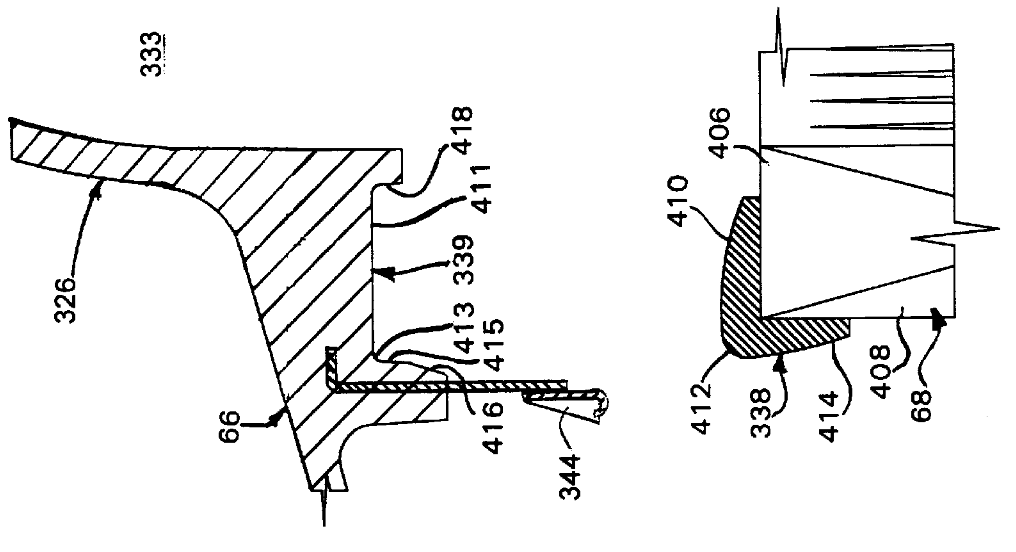
Figure 23:
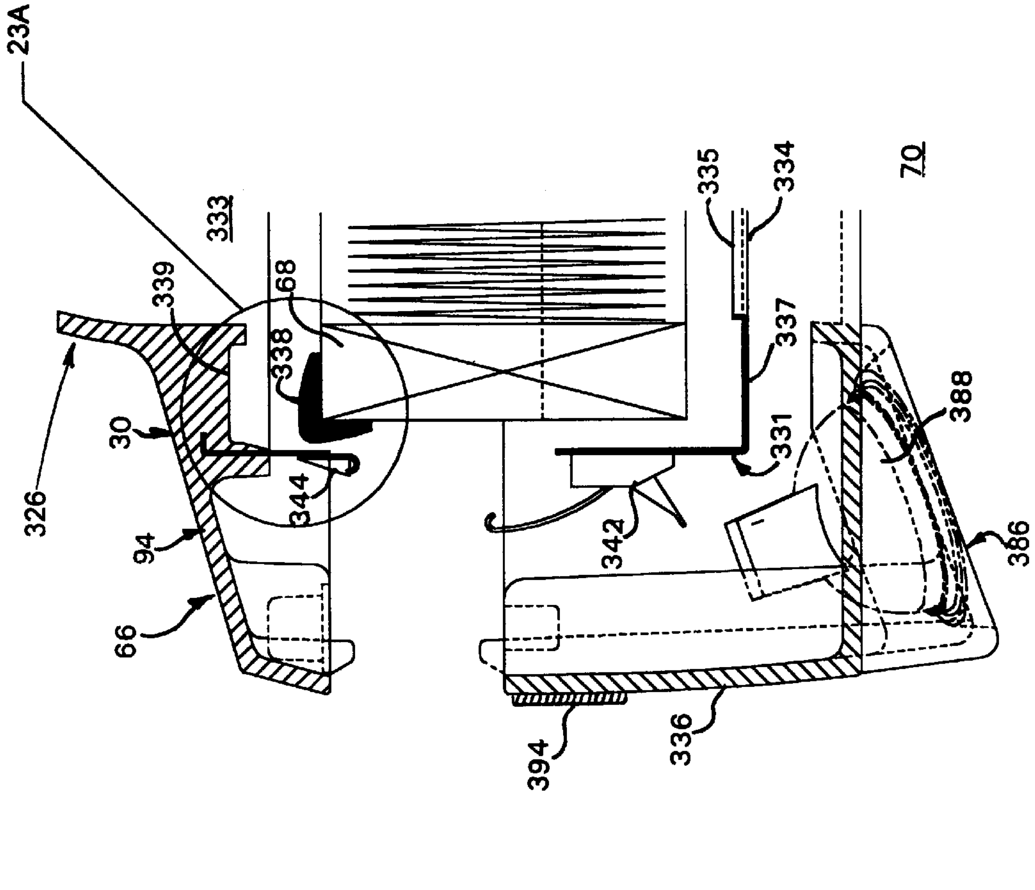

FIG. 23 is a partial cross sectional view of the top filter hood assembly with the key components unlatched and separated.

FIG. 23A is a exploded view of the final filter sealing gasket and receptacle details.

Figure 24:
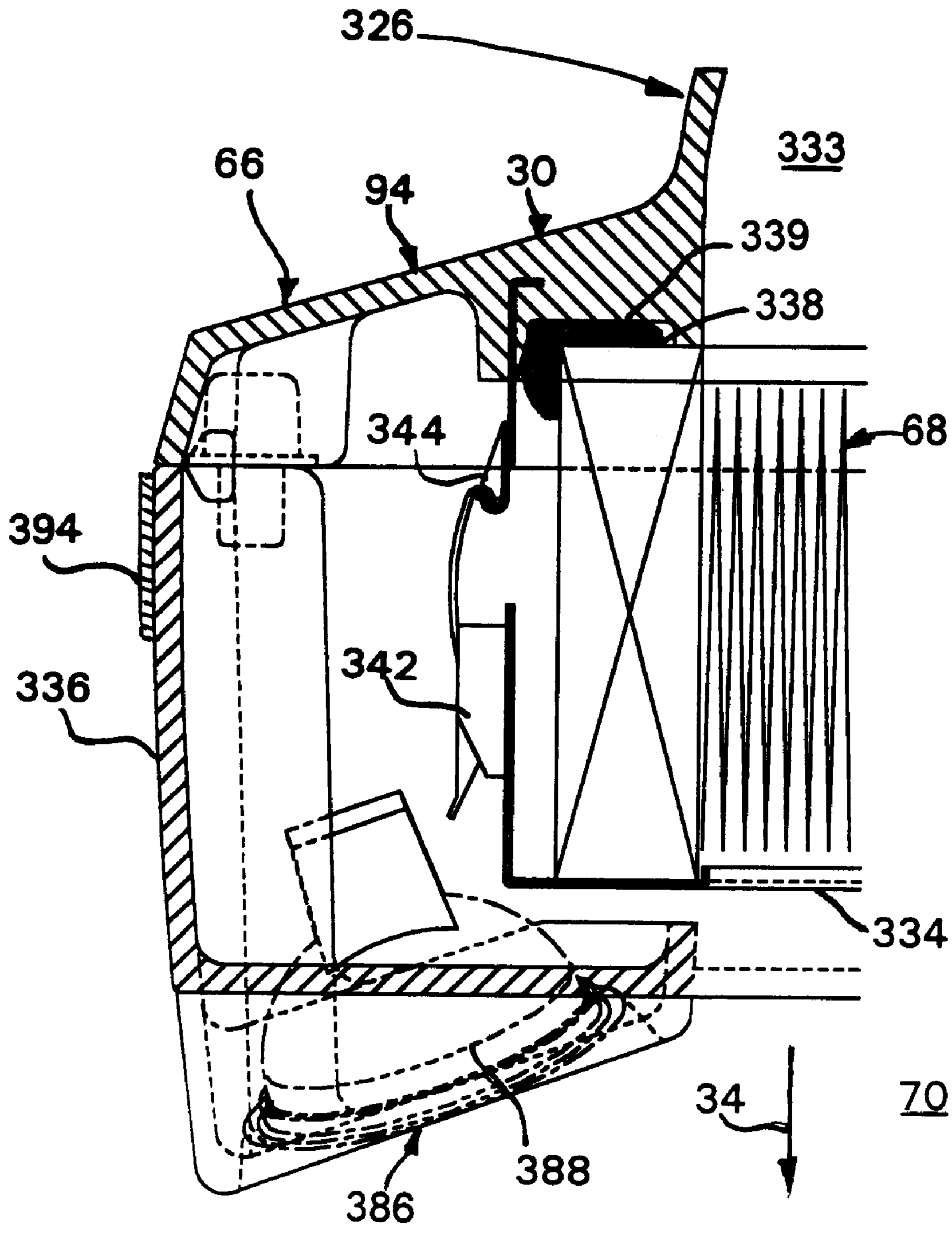

FIG. 24 is a partial cross sectional view of the top filter hood assembly with the filter latched.

DESCRIPTION

Introduction

This rollably positioned, passable through doorways, adjustably directed clean air supply assembly 30, illustrated throughout the drawings, is conveniently maneuvered to a volume location 32, wherever located within a weather controlled, where very clean air 34, per strict specifications, is needed, when a procedure is being undertaken, which cannot be hindered by the presence of contaminating substances. These clean air supply assemblies 30 are used: where medical operations are being performed; where medical preparations are being undertaken; where medical patients are recovering; where food is being served, prepared, manufactured or packaged; where electrical, electronic, and electromechanical products are being manufactured, assembled, and packaged; where optical components are being manufactured, assembled and packaged; and where any human endeavor might otherwise be jeopardized by the presence of contaminating substances.

Figure 10:
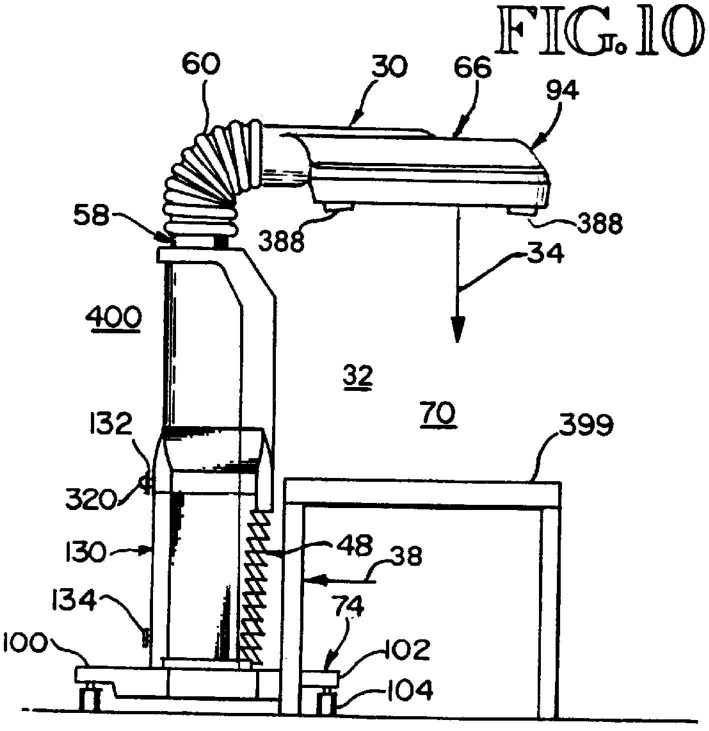
FIG. 10 is a right side view of the assembly, shown in FIG. 1, illustrating a portion of a room where a work table is located adjacent the clean air supply assembly which is aiming clean air directly over the work table, thereby creating a clean airflow working table area.

Each of these clean air supply assemblies 30, as shown in FIG. 10, draws air in near the bottom 36 thereof, in a horizontal flow path 38, which is sufficiently located above a floor level 40, or ground level 40, to pick contaminates out of the air but avoid picking up any possible contaminating substances off the floor 42, which may have already filtered out of the surrounding air 44 in a volume location 32. This horizontal flow path 38, leaving the surrounding air 44, enters a front pre-filter assembly 48 of the clean air supply assembly 30, in respect to the lower hollow housing 50 thereof. The starting and continued movement of air into, throughout, and out of this clean air supply assembly 30, occurs during the operations of an interior powered air moving assembly 52, which is mounted in the lower hollow housing assembly 50, as shown in FIG. 12.

Figure 11:
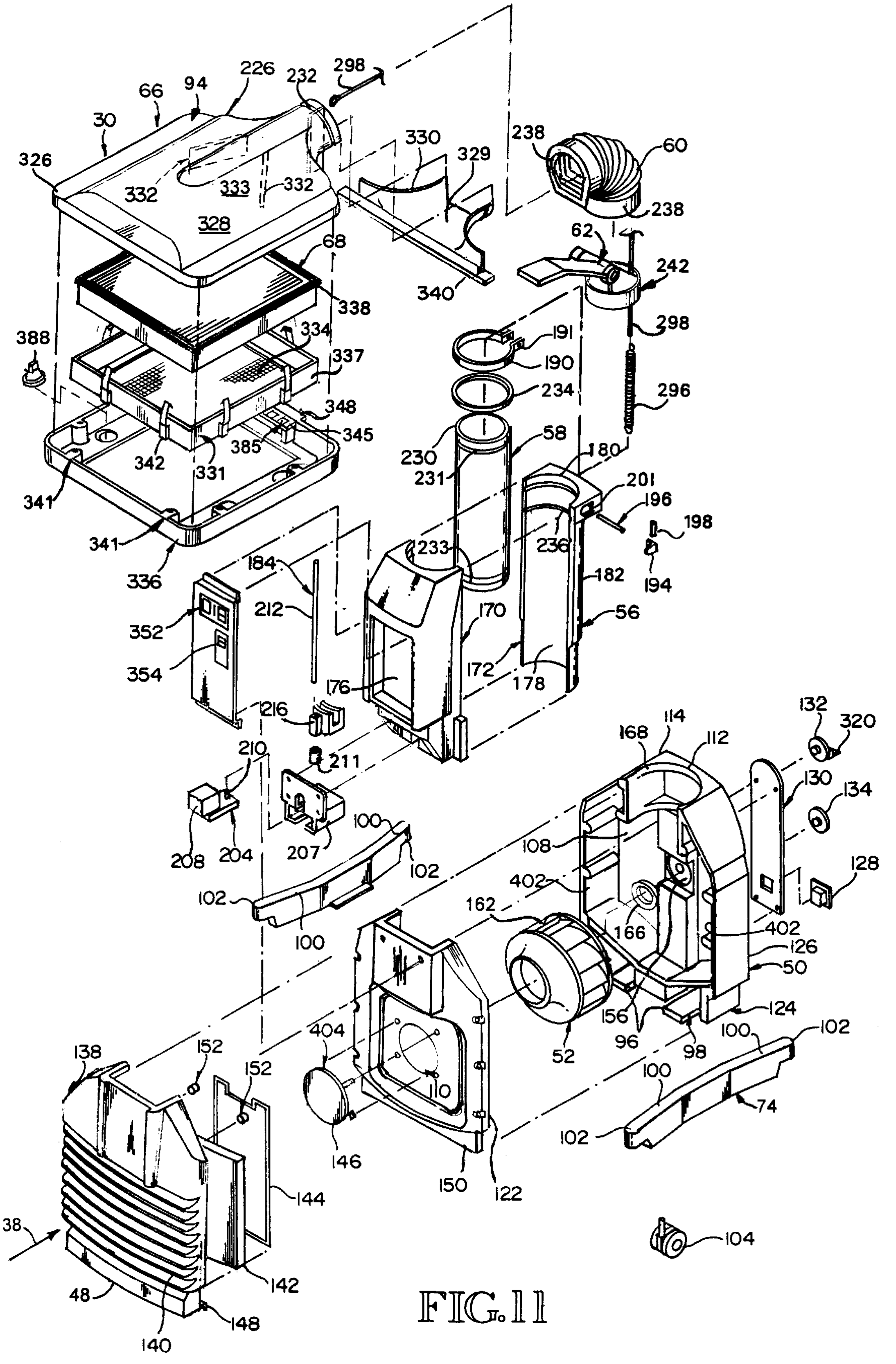
FIG. 11 is an exploded perspective view of most of the essential parts of this clean air supply assembly; however, not shown are: the electric motor to drive the backward inclined impeller, which moves the air through this assembly; the electrical components and accompanying electrical circuits; sound deadening materials; sealing materials; adhesive materials; and various fasteners.

The pre-filtered air 54, as shown in FIG. 11, upon leaving the interior powered air moving assembly 52, flows upwardly though a tower hollow housing 56, which is supported on the lower hollow housing 50. Thereafter, this pre-filtered air 54 continues flowing upwardly through an adjustable height telescoping structural tube 58. Upon exiting from this tube 58, the pre-filtered air 54 directly enters a self-sealing bellows 60 which acts as a secured flexible plenum between the telescoping structural tube 58 and a top filter hood assembly 66, and which surrounds a tilt adjustment assembly 62, as shown in FIG. 11. Then upon exiting the bellows 60, the pre-filtered air 54, enters the top filter hood assembly 66, shown in FIG. 11, to pass through a high efficiency particle arrestor air filter 68, before being directed to pass to and by a specific locale 70, where clean air 34 is required, as shown in FIG. 10.

Figure 8:
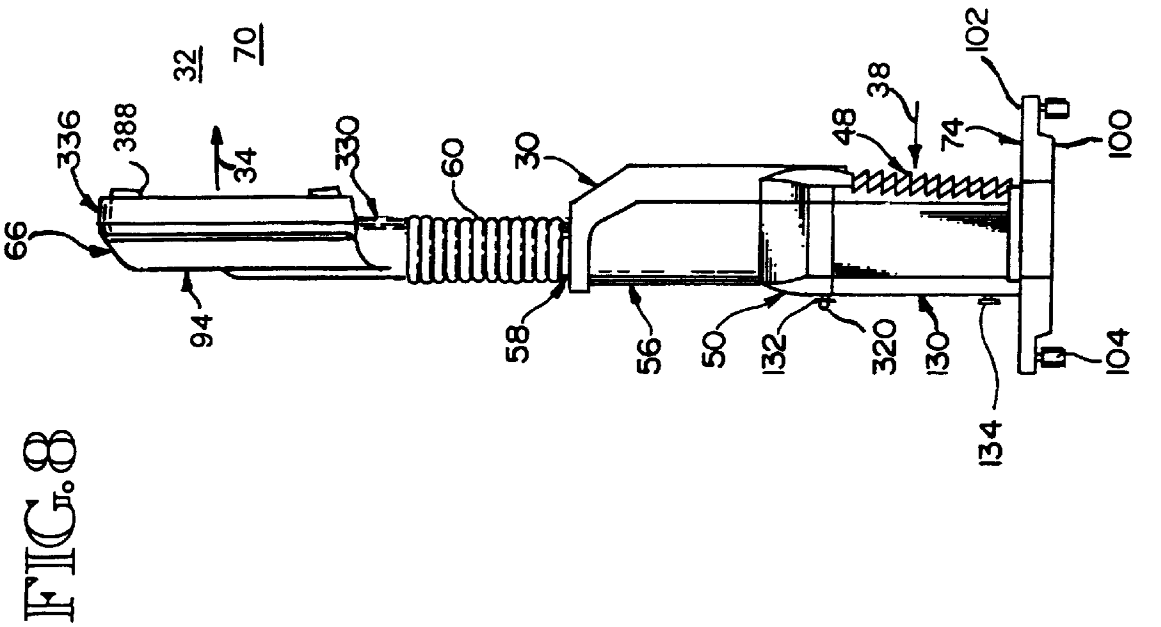
FIG. 8 is a right side view of the clean air supply assembly, shown in FIG. 1, illustrating how the top filter hood assembly is tilted to the full upright position, with upper air out flow directed horizontally.
Figure 7:
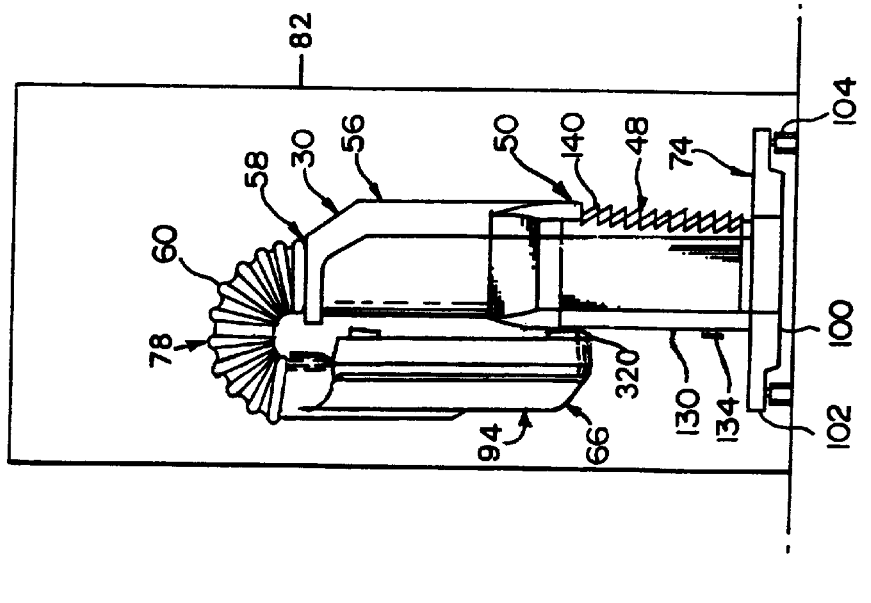
FIG. 7 is a right side view of the assembly, shown in FIG. 1, illustrating how the top filter hood assembly is tilted down against the lower housing back, so this clean air supply assembly can be moved through a narrow doorway or transported.

Each clean air supply assembly 30 has a bottom rollable support assembly 74, secured to the lower hollow housing 50, which insures the convenient movement thereof, as shown in FIGS. 7 and 8. Upon adjustment of the tilt adjustment assembly 62, the top filter hood assembly 66 is arranged for the convenient passage of the clean air supply assembly 30 to the specific locale 70, where clean air 34 is required, as shown in FIG. 10. Then the top filter hood assembly 66 is arranged to direct the clean air to the specific locale 70 and beyond, eventually being returned, to be drawn through the front pre-filter assembly 48, as shown in FIG. 10.

General Appearance and Arrangement

Figure 9:
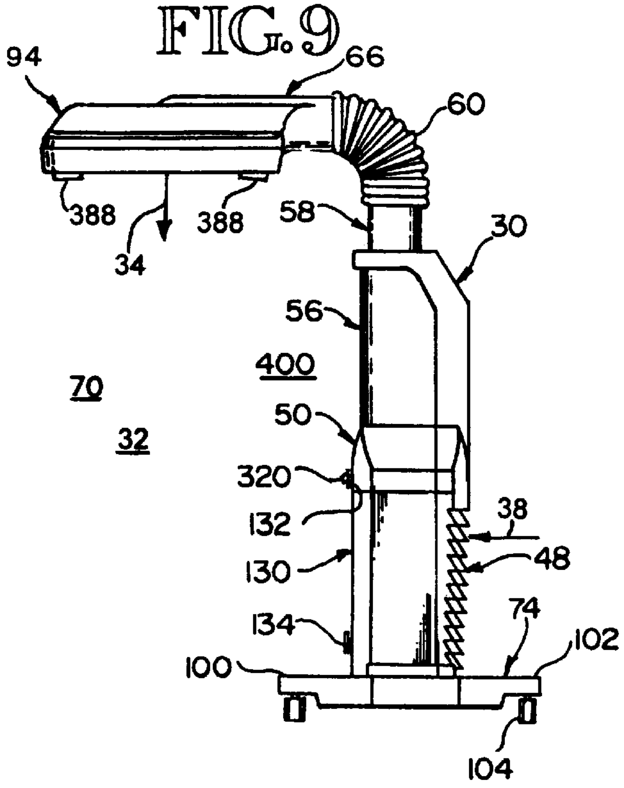
FIG. 9 is a right side view of the assembly, shown in FIG. 1, illustrating how the top filter hood assembly has been raised, rotated around and tilted to direct clean air down through the backside locale of the clean air supply assembly.

This improved, rollably positioned, passable through doorways, adjustably directed clean air supply assembly 30 has the general overall appearance, as illustrated in FIGS. 1 through 8, when the adjustment height telescoping structure tube 58 is in its lowest position. In FIGS. 9, 10 and 22, this adjustably directed clean air supply assembly 30 has the top filter hood assembly 66 thereof located at a higher elevation, when the adjustable height telescoping structure tube 58 is in one of several adjustable height positions 76, rotatable positions 77 around the vertical axis, and angularly adjustable 75 around the horizontal axis.

Figure 1:
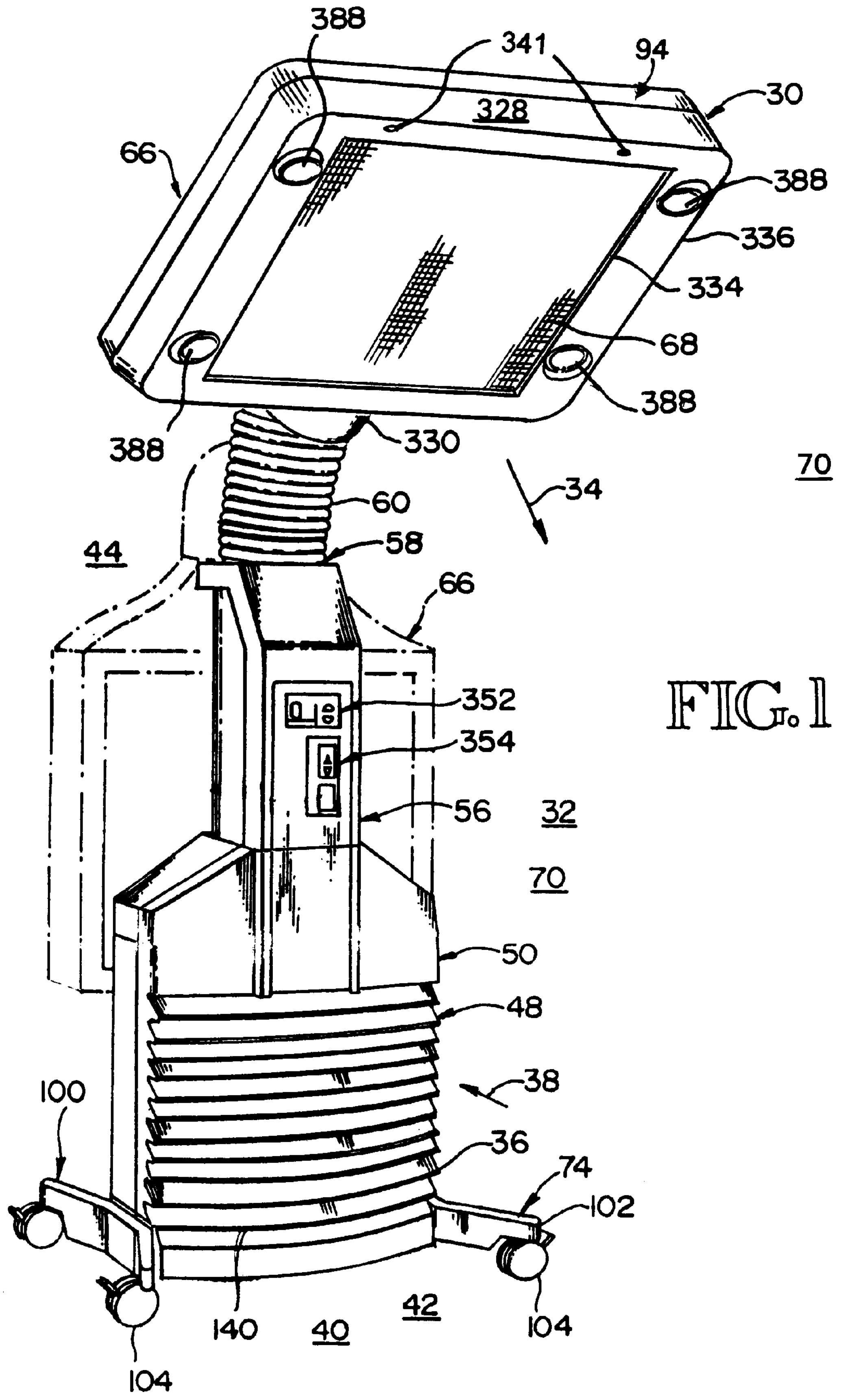
FIG. 1 is a front perspective view of an embodiment of this clean air supply assembly, showing the top filter hood assembly arranged optionally in a forty-five degree position to direct the clean air at this selected angle, with dotted lines indicating the 180 degree down position of the top filter hood assembly for storage or transportation.

As illustrated in FIG. 1, via dotted lines, and in FIG. 7, the top filter hood assembly 66 is rotated downwardly into a non-operating position, with the filter hood assembly 66 resting against the rubber hood receiving bumper 320, referred to as "Stored Position" 78, for convenience of storing and/or passing through a doorway 82, the entire clean air supply assembly 30. Also, as shown in FIG. 9, the top filter hood assembly 66, is conveniently raised and rotated to direct clean air through the backside locale of this assembly 30. In FIG. 8, the top filter hood assembly 66 is positioned directly upright, referred to as "Hood Upright Position" 80, to provide a clean zone for a larger area within a room through greater separation between filter outlet of the clean air 34 and the pre-filter inlet 48.

Figure 2:
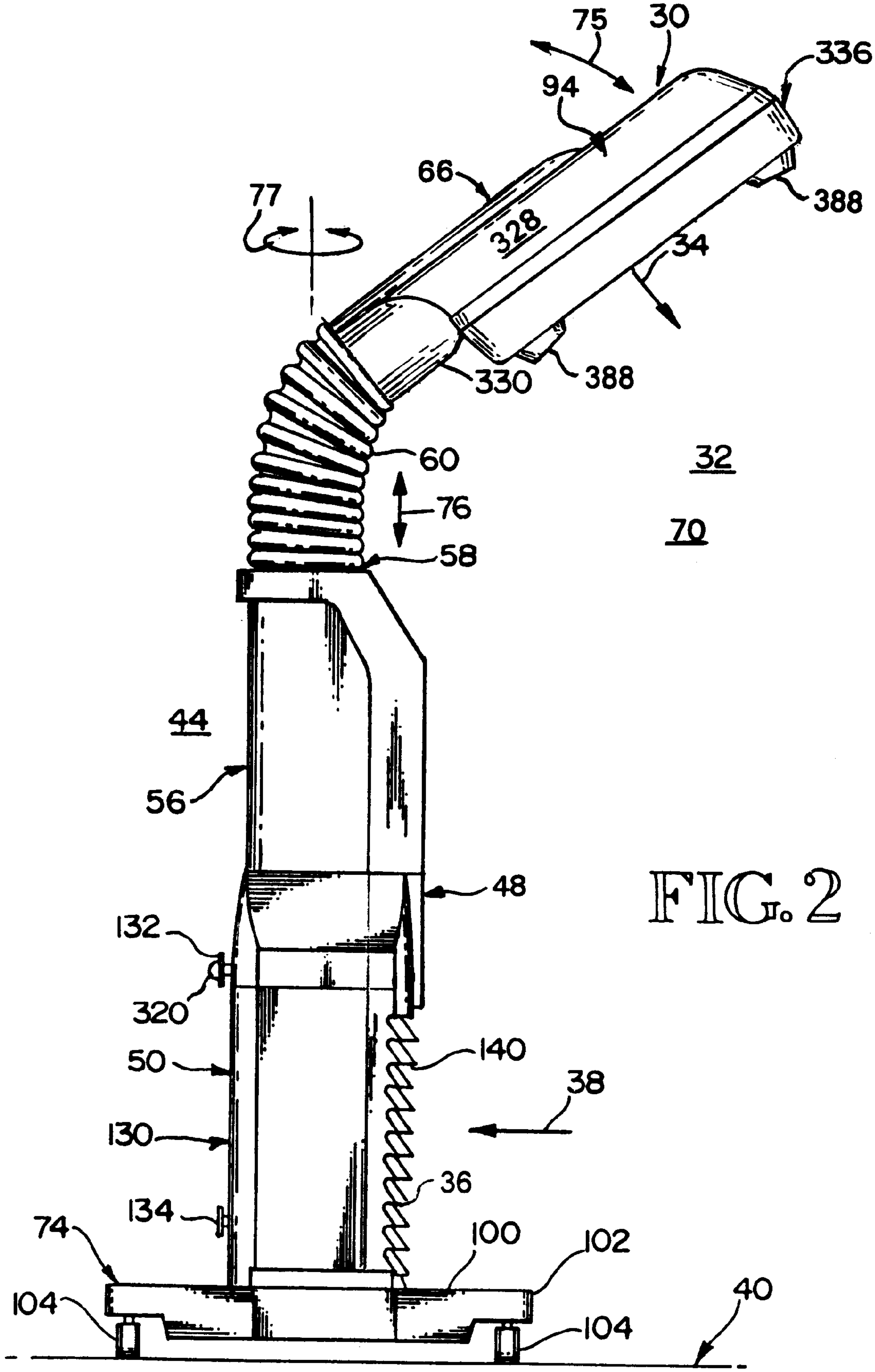
FIG. 2 is a right side view of this assembly, shown in FIG. 1.
Figure 3:
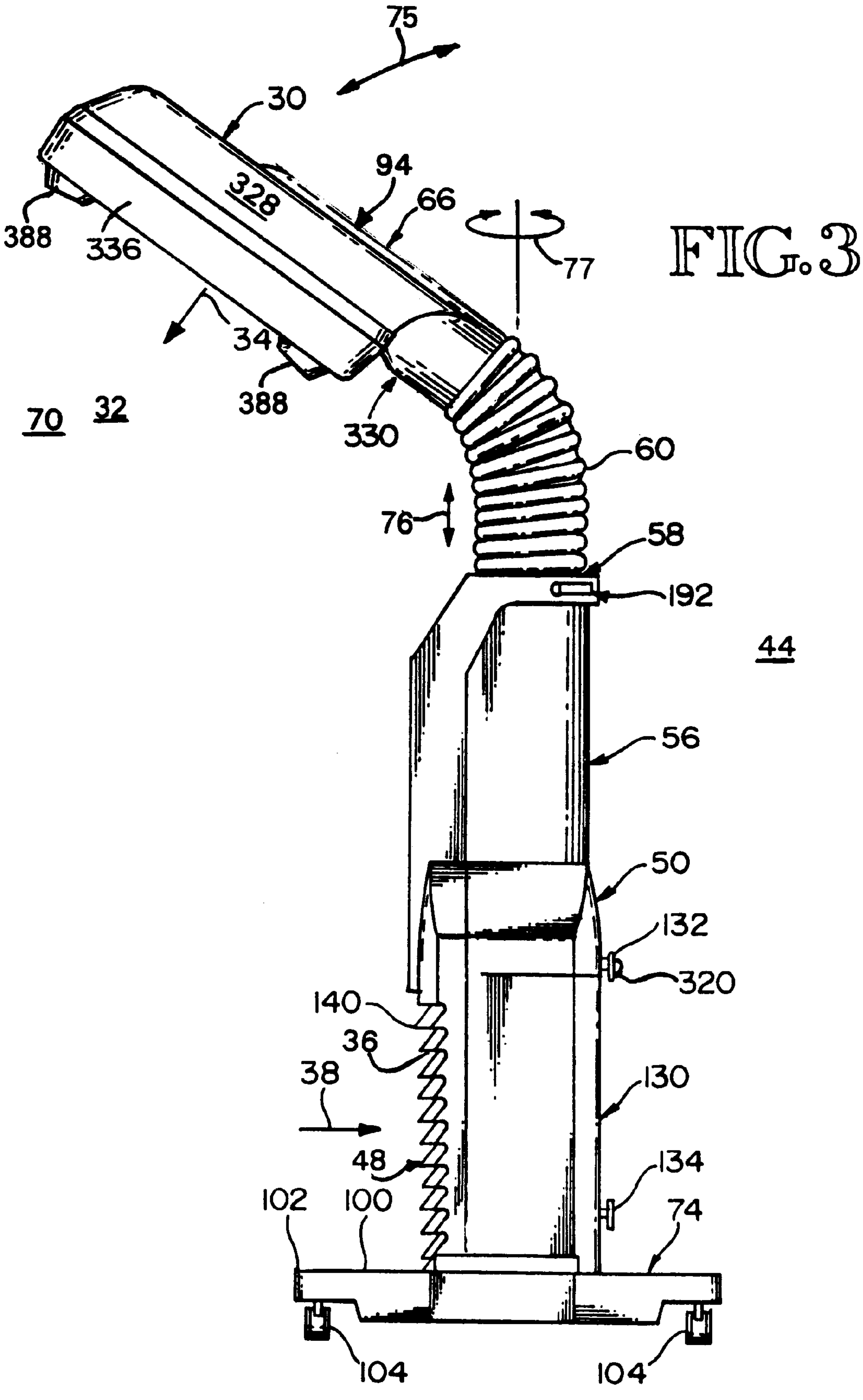
FIG. 3 is a left side view of the assembly, shown in FIG. 1.
Figure 4:
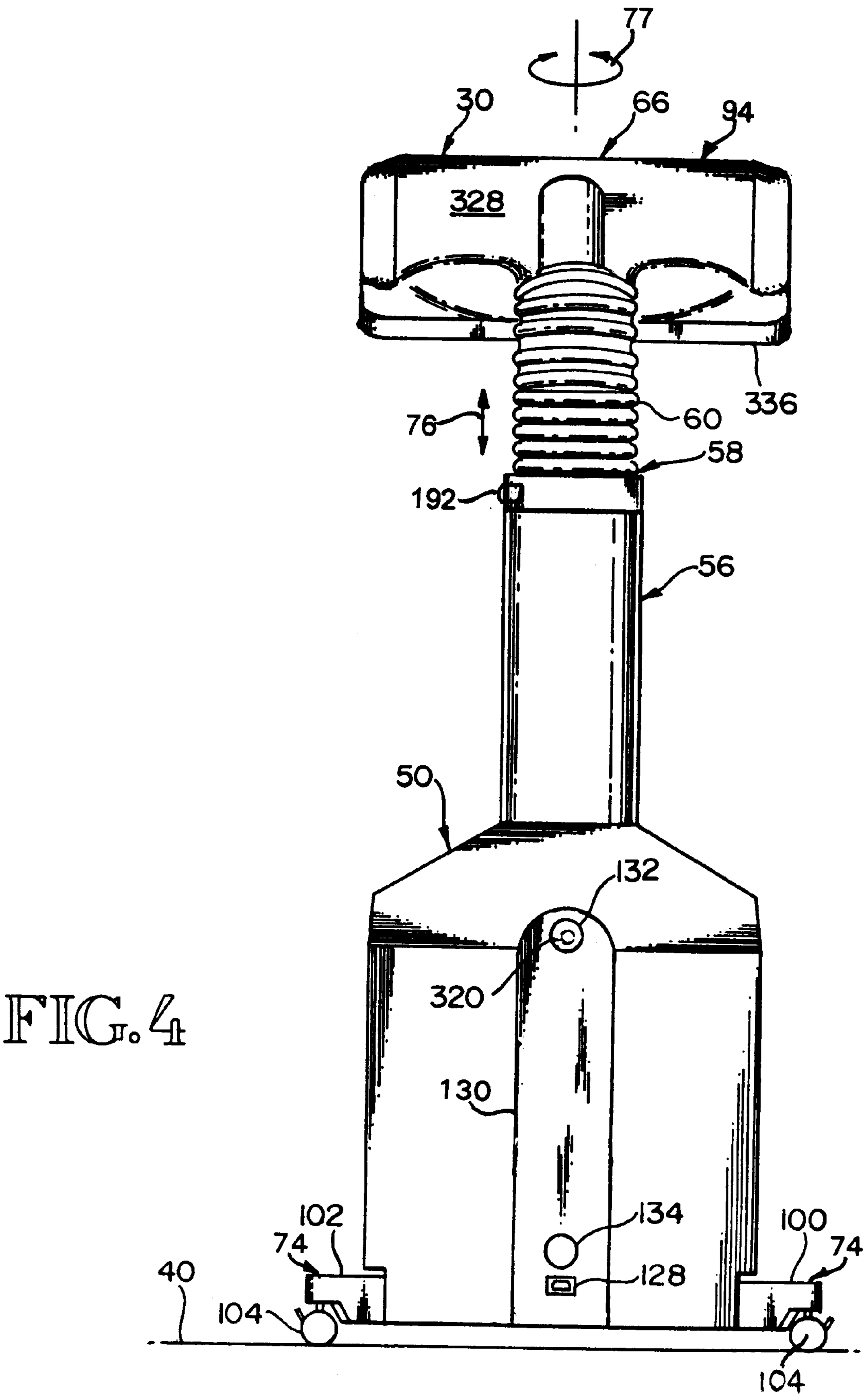
FIG. 4 is a rear view of the assembly, shown in FIG. 1.

At other operating times the top filter hood assembly 66 can be positioned at an angle, as shown in FIGS. 1 through 3. Then during many operating times, the top filter hood assembly 66 is arranged horizontally, as illustrated in FIGS. 10 and 22. Also, as shown in FIG. 22, a surrounding isolation shroud of clear plastic material 84, is secured about the lower portions 86 of the top filter hood assembly 66, to direct the clean air 34 down and through a attached supporting work tray 88, which has multiple spaced air passages 90.

As illustrated in FIG. 20, an enlarged top filter hood housing assembly 94 is normally rectangular, with the horizontal axis thereof being longer than the transverse axis thereof. When an enlarged top filter hood housing assembly 94 is installed, then as shown in FIG. 12, counterweights 96 are positioned in a weight compartment 98 of the lower hollow housing 50 of this adjustably directed clean air supply assembly 30.

At all times, as illustrated in FIGS. 1 through 10 and FIG. 22, the bottom rollable support assembly 74 is arranged close to ground floor level 40, to pass under many obstructions. There are four extending horizontal legs 100, each having at the ends 102 thereof, a swivel, lockable, caster 104. This arrangement of the rollable support assembly 74, in conjunction with the utilization, as needed, of counterweights 96, insures the overall stability of this clean air supply assembly 30, during the clean air operations thereof, and during the movement and storage times thereof.

The Lower Hollow Housing

The lower hollow housing 50 of this clean air supply assembly 30, which is supported on the bottom rollable support assembly 74, serves as a lower hollow body plenum 108 to receive, near floor or ground level 40, horizontally flowing air 38 through a front entry radius edged opening 110 thereof, and to discharge at an lower hollow housing exit 112 at the top 114 thereof, vertically flowing air 116, as shown in FIG. 12. This housing 50 also serves as a support for: the front pre-filter assembly 48; an interior powered air moving assembly 52; and a tower hollow housing 56, which serves as plenum 118 to receive air flowing through the exit 112 in the top 114 of this lower housing 50.

Preferably, as illustrated in FIG. 11, this lower hollow housing 50 is made of two plastic molded housings, one being the lower center hollow housing 122 to receive, position and hold, the front pre-filter assembly 48, and other being the lower rear hollow housing 124 to receive, position and hold the interior powered air moving assembly 52. Also the back 126 of this rear hollow housing 124 receives and holds electrical components, such the electrical receptacle 128 and the electrical cord receiving panel 130 with the respective top and bottom wraparound electrical cord supports 132, 134.

Front Pre-Filter Assembly

The front pre-filter assembly 48, which is supported on the center hollow housing 122 of the lower hollow housing 50, to receive the incoming horizontal flowing air 38, as shown in FIG. 11, has: a pre-filter door housing 138 with horizontal spaced intake louvers 140; a activated charcoal pre-filter 142 fitted within the pre-filter door housing 138; a pre-filter retainer spring 144 to hold the activated charcoal pre-filter 142 within the pre-filter door housing 138; an air intake baffle and sound deflector 146 positioned on the front portion 122 just ahead of the front entry opening 110 to insure a more uniform flow of incoming air through a increased area of the activated charcoal pre-filter 142; an integral transverse lower hinge action flange 148 to insertability fit into a transverse lower ledge 150 on the center portion 122 of the lower hollow housing 50, as illustrated in FIGS. 12 and 12A. In this way, the pre-filter door housing 138 is supported at the bottom thereof; and then at the top of the pre-filter door housing 138, spaced press-in multiple-time fastener assemblies 152 are used to complete the installation of the pre-filter door housing 138.

Interior Powered Air Moving Assembly

The movement of the air through this clean air supply assembly 30, occurs when the interior powered air moving assembly (blower/motor) 52 is operating. This air moving assembly 52 is secured to the back housing 124 of the lower hollow housing 50, as shown in FIGS. 12 and 13. A mounting structure 156, in conjunction with fasteners, not shown, is used to non-rotatably secure both an electric motor shaft 158 and an armature 160, secured in turn to this shaft 158. Then a backward inclined impeller 162 is rotatably positioned about the electric motor shaft 158, and an electrical coiled field 164 is secured to this impeller 162. When electrical power is applied to the respective armature 160 and field 164, the backward inclined impeller 162 is rotated at operator selected revolutions per minute, to move air through this clean air supply assembly 30.

Tower Hollow Housing

The pre-filtered air 54, upon leaving the backward inclined impeller 162, moves upwardly through the lower hollow housing exit 112 in the top 114 of the lower hollow housing 50 to enter the tower hollow housing 56. In the top 114 of the lower hollow housing 50 a receiving structure 168 is formed to receive and to hold, in part, the tower hollow housing 56.

Preferably, this tower hollow housing 56, is formed upon the assembly of a front housing 170 and a rear housing 172, as shown in FIG. 11. After assembly and positioned, in part, in the receiving structure 168, the tower housing 56 serves: as a plenum 118, as shown in FIG. 12, to guide the upward flow 116 of the prefiltered air 54; as a front control panel receiving structure 176; as a slideably receiving structure 178 to position the adjustable height telescoping structural tube 58 during up and down, and rotational movements, thereof; as a clamping assembly receiving structure 180, as shown in FIG. 21, having brake tab receiving hole 181, and, optionally; as an electrical drive powered raising and lowering assembly receiving structure 182, as illustrated in FIGS. 11 and 12.

To ease of the relative movement between the adjustable height telescoping structural tube 58 and the tower hollow housing 56, spaced vertical interior bearing material strips 240 such as ultra-high molecular weight plastic are mounted vertically on the back and both sides, in the tower hollow housing 56, below the air o-ring seal 234, positional in the o-ring receiving groove 236, as shown in FIG. 21. In addition, a horizontal top inside edge band of ultra-high molecular weight plastic, to form a horizontal interior bearing surface 239, is secured at the top of the hollow tower housing 56 to provide a complete circumferential top-bearing surface 239.

An Adjustable Positioning Subassembly

An adjustable positioning subassembly 184 has, in the manual lift embodiment, not shown thereof, a clamping brake assembly 188 positioned in the clamping assembly receiving structure 180 of the tower hollow housing 56, as illustrated in FIGS. 11 and 21. This clamping assembly 188 has an adjustable circumferential clamping ring 190 with tabs 191 for insertion through tab receiving hole 181. A clamp ring interior lining material 193 which is used to provide both a slideability surface when unclamped, and when clamped locks telescoping structural tube 58 without undue pressure on the tube structure. An adjustable toggle fastener assembly 192, having: a cammed toggle lever 194 with aligned holes 199; a threaded shaft 196, passing through the tower shaft receiving hole 201 of the housing 56, and holes 197 of the tabs 191; a pivot pin connector 198 with a hole 195 for passing through this hole threaded shaft 196; passing through like diameter alined holes 199 on the lever 194 to join the lever 194 to shaft 196, and a length adjustment nut 200, operated to firmly clamp the adjustable circumferential clamping ring 190, about the adjustable height telescoping structure tube 58, at one of many selectable height positions, which in turn places the top filter hood assembly 66 at the corresponding selectable height position thereof.

The adjustable positioning subassembly 184 has, in the electrical powered lift assembly 204 or embodiment 204 thereof, as illustrated in FIGS. 11, 14, 15, and 16: a power lift housing 206 mounted in electric drive powered raising and lowering assembly receiving structure 184 of the tower hollow housing 56; and electric lift motor 208 secured to the power housing 206; the power housing is secured to the front tower hollow housing 56 with the mounting bracket 207; a drive shaft gear assembly 210 secured to the power housing 206 and connected to the electrical motor 208; an upright drive screw shaft 212 secured to the shaft gear assembly 210 by a machined coupler bushing 211; a top support drive shaft bushing 214 secured to the tower hollow housing 56 to receive the upright drive screw shaft 212, at the top thereof; a supporting guide block 216 having a threaded central hole 218, which thereby receives the upright drive screw shaft 212, and also having a top restrictive entry arcuate captive receiving channel 220 to receive a bottom section of the adjustable height telescoping structure tube 58, to thereby keep this tube 58 from being lifted free of its placement in the tower hollow housing 56; and an torsional support upright guiding channel 224, positioned within the tower hollow housing 56, to guide the up and down movement of the supporting guide block 216, while preventing rotation thereof.

When the lift electric motor 208 is operating and the upright drive screw shaft 212 is then being rotated, the supporting guide block 216, depending on the rotation of the shaft 212, will either be raising or lowering the adjustable height telescoping structural tube 58, and consequently, either be raising or lowering the top filter hood assembly 66. The supporting guide block has a captive tube receiving channel 220 that has a tube containment lip 222, which interlocks captivity with the structural tube containment groove 233 of the telescoping structural tube 58, as illustrated in FIG. 15, to securely hold the structural tube 58 to the supporting guide block 216.

In a embodiment 226 of the clean air supply assembly 30, illustrated in FIG. 11, the adjustable positioning subassembly 184 includes both the lift brake clamping assembly 188 and the electrical powered lift assembly 204. Each of these assemblies 188 and 204 are used independently, or are used together to keep the adjustable height telescoping structure tube 58 at a selectable height, and thereby to keep the top filter hood assembly 66 at a selectable height.

Adjustable Height Telescoping Structure Tube

The adjustable height telescoping structural tube 58 as shown in FIGS. 11 and 12 serves as an adjustable height plenum 230 to receive pre-filtered air 54 leaving the tower hollow housing 56 and plenum 118 thereof and direct this air upwardly while being moveably supported on the tower hollow housing 56, for up and down adjustments and also for partial rotary adjustments. This telescoping structure tube 58 also serves as a support, both for a tilt adjustment assembly 62, which is used in arcuately moving, stopping, and holding, a top filter hood assembly 66, and for a self-sealing bellows 60 surrounding the tilt adjustment assembly 62.

To maintain an air seal between this adjustable height telescoping structure tube 58 and the tower hollow housing 56, an air seal O-ring 234 is placed in a receiving groove 236 which is formed in the tower hollow housing 56 near the top thereof, as shown in FIGS. 11, 12, and 21.

The Tilt Adjustment Assembly Utilizing Left and Right Friction Clutches Positioning Assemblies The tilt adjustment assembly 62 is mounted on top of the adjustable height telescoping structural tube 58, as illustrated in FIGS. 11 and 17. This assembly 62 is used when the position of the final filter hood assembly 66 is moved to angularly modify the final filter outlet direction of clean airflow 34 or to fold the final filter hood assembly 66, for example, into the storage or transportation position 78 as shown in FIG. 7. At such times, this tilt adjustment assembly 62 is utilized during the arcuately positioning and holding of the top filter hood assembly 66 without the use of any mechanical locking devices. In the preferred embodiment thereof, as shown in FIG. 17, there are two subassemblies 244 and 246, referred to as left and right friction clutch positioning assemblies 244, 246. They allow for a balanced rigid structural support arcuating operation. Because of this use of two spaced friction clutch positioning assemblies 244, 246 placed at the sides of the airflow plenum, there is minimal airflow obstruction. Should either one of the 244 or 246 friction clutch sub-assemblies suffer any reduction in holding capacity each one is sufficiently independent of the other to provide some safety in the tilting operations.

In the perspective view, which is also a partial exploded view of FIG. 17, one subassembly 244 is shown assembled, and the other subassembly 246 is shown with the components thereof spaced apart, i.e. exploded, to more clearly illustrate them and their arrangement.

In respect to the components of the tilt adjustment assembly 62, as shown in FIG. 17 they are:

Spaced, canted, vertical support arms 248 and 250 which are permanently mounted to the lower circular hinge bracket 242 which has fastening holes 252 to affix, with fasteners, not shown, to the corresponding tube holes 254 in the telescoping structural tube 58;

Assembled together are: the canted vertical support arms 248 and 250, each having alignment holes 256 not readily observed; both the left and right complete adjustable friction positioning assemblies 244 and 246; along with the center located pivot bracket 260. They are all kept in position by passing bolt 258 through their resulting entire combination structure.

The bolt 258 which serves as the pivot axis, is therefor also referred to as a main pivot bolt 258. It is extended through left side friction assembly 244 with the inside support bushing 281, then through the pivot bracket 260 and then through the right side friction assembly 246 with another inside support bushing 281. Then the bolt 258 is tightened by using the self-locking nut 290 with appropriate compression flat washers 272 and compression caps 274. This tightening friction spreads the loading across the entire face of the fiber friction plates 262, to increase the load holding capacity of these fiber friction plates 262 with the steel notch plate assemblies 264. The crowned belleville spring washers 278 provide tension to the friction clutch assemblies 244 and 246, when the self-locking nut 290, which is flush against the outside compression flat washer 272, is tightened and thereby the belleville spring washers 278 are then flattened. This allows the tension from the belleville spring washers 278 to maintain constant tension during any wear in the friction clutch assemblies 244, 246 through usage.

Belleville spring washers 278 are compressed when in contact with the outside compression cap 274, on one side and in contact with the inside compression flat washer 280 on the other side. The overall axial compression force or load, via washers 278 is spread to load all of the surfaces of each respective friction clutch subassembly 244, 246, is fitted about the main bolt shaft 258. The belleville spring washers 278, are positioned about the bolt shaft 258 at the respective sides of the overall grouping of the alternating spaced fiber friction plates 262, and steel friction plates 264.

The selected portion of the counterbalance force or the lifting pivotal loading force, required for holding the top filter hood assembly 66 in-place at any desired angle 75 for work or storage, is transferred from the lower mounting arm brackets 248 and 250, through the friction clutch subassemblies 244 and 246, to the upper pivot bracket 260, through the utilization also of the slots 284, machined in the steel notched friction plates 264, which intercept the pivot plate bracket receptacle surfaces 285 of the upper pivot bracket 260 to in turn transfer the holding capability directly to the top filter hood housing 94.

Also attached to the canted vertical support arms 248 and 250 at their mounting holes 282 are the torsion indent springs assembly 268 by using mandrels 276, which are secured with fasteners 267 and washers 286 to anchor the center coils portion 68 of the torsional indent springs assembly 268. The torsion indent spring assemblies 268 each have an arm 266, and each arm 266 has a free-wheeling rachet roller 265 at each end 270 thereof, that with pressure from the torsional spring, fits into the corresponding sized notches 263 of the steel friction plates 264 to create additional force to assist locking, in-place, the filter hood assembly 66, along with the force created by the alternating steel 264 and fiber 262 plates. When these forces are applied, the chafing free friction of the plates revolving against each other is created to provide the overall desired frictional forces.

Alternative and/or Supplemental Tilt Adjustment Assemblies Utilizing a Counterweight Tension Spring Assembly In addition to the holding capacity of the friction clutch subassemblies 244, 246, the filter or top filter head assembly 66 is also held in place at any desired angled position 75, without additional mechanical locking devices, by incorporating a head counterweight tension spring assembly 288. This assembly utilizes a upper tension spring attachment cable 298 and tension springs 296. The cable assembly 288, which is attached on one end at the bottom of the telescoping structural tube 58 with lower tension spring mounting clip 292 which is secured with fasteners 267, washer 293, and secured with self locking nut 294. The tension springs 296 extend up the rear inside of the tube 58, thereby minimizing air obstruction, and they are attached to the cable 298. This cable 298 thereafter passes up and over a cable pulley roller or wheel 300, which is mounted on the back side of the lower hinge mounting bracket 242, by using the pulley wheel mounting bracket 302. The cable 298 is then connected to the upper counterweight hood mounting anchor pin 304, which is secured to the pivot bracket upright stiffening attachment strut 261 that is located at the airflow entry of the top filter hood assembly 66. When the tension cable 298 is so secured, it has been passed over the top center of the pivot bracket 260. Therefore when the final or top filter head assembly 66 is to be placed in the stored or folded down position 78 shown in FIG. 7, during the last 90 degree arc movement of the head assembly 66, the cable 298 moves latter rollably thereby not increasing the spring tension, while allowing the top filter head assembly 66 to remain in the fixed down position shown in FIG. 7. When the top filter head assembly is completely folded in the down storage or transportation position, the weight of this top filter hood assembly 66 offsets the tension of the counterweight springs 296. Portions of the cable 298 are then in an over-center position cable position passing over the pivot arm bracket 260.

The Operation of the Clean Air Supply Assembly Hears and Feels the Tilting Adjustments He or She is Making The ratchet rollers 265, captivity secured in place on the respective spring ends 270 of the torsion spring assembly

268, provides an operator, when he or she is adjusting the tilt adjustment assembly 62, the ability to hear and feel the ratcheting adjustments being made, as these ratchet rollers 265 create sounds and forces when moving in and out of the ratchet notches 263;

Adjusting the Amount of Friction Resistance Created in the Tilt Adjustment Assembly, the Overall Hinge Assembly During the assembly of the tilt adjustment assembly 62, the self locking nut 290 is placed on the bolt shaft 258, also referred to as the main pivot bolt 258 at its threaded end 258. When the nut 290 is tightened, the right positioning assembly 246 is held together, as also is the left positioning assembly 244. The extent of the tightening of this nut 290 determines the amount of the frictional resistance created throughout the tilt adjustment assembly 62, then when the left and right positioning assemblies 244, 246 have been so assembled and tightened, the pivot bracket 260 is thereby ready to be controllably adjusted from a vertical position, through all selected angular positions. Thus consequently, the top filter hood assembly 66, to which the pivot bracket 260 is secured, is also ready to be so controllably positioned through like selected angular positions 75 between any of the operational positions, shown in FIGS. 8,9, and 10, and to the movable and/or stored position shown in FIG. 7.

Bellows for Sealing and Guiding the Flow of the Pre-filtered Air from the Adjustable Height Telescoping Structural Tube, about the Tilt Adjustment Assembly, and into the Top Filter Hood Assembly.

As indicated in FIG. 11, self-sealing bellows 60 is positioned to surround the tilt adjustment assembly 62 and portions of the head counterweight and friction spring assembly 288, while providing adequate clearance for the flow of pre-filtered air 54 coming up from the adjustable height telescoping structural tube 58 and flowing past these assemblies 62 and 288, and beyond into the top filter hood assembly 66. At each end of the bellows 60, a respective seal is maintained by an integral circumferential lip 238 or end 238, which sealably inter-fits with respective receiving grooves 231, 232 on both the telescoping structural tube 58 and the top hood assembly 66. This sealing is very effective because the internal diameter at each end 238 of the bellows is made slightly undersized. When each end 238, i.e. integrated circumferential lip 238 is installed and thereby stretched over the corresponding top filter head housing 326 with corresponding groove 232 and adjustable interconnection tube 58 with its corresponding groove 231 thereby eliminating the need to use any additional clamping.

Top Filter Hood Assembly to Receive Pre-filter Air Leaving the Self Sealing Bellows to Finally Filter the Air and then Direct the Completely Filtered Air in a Flow Direction Determined by the Arcuate Position of this Top Filter Hood Assembly.

The top filter hood assembly 66 is tiltably secured to the adjustable height telescoping structural tube 58, also referred to as the telescoping structural tube assembly 58, by utilizing the tilt adjustment assembly 62. The tube assembly 58 having the tube rotational limit pin 346, as shown in FIG. 16, provides a controlled stoppable rotating positioning through three hundred and forty five degrees of arcuate positioning of this top filter hood assembly 66, in respect to a horizontal plane.

This top filter head assembly 66, as shown in FIG. 11, has a hood top housing 326 contoured and sized to receive the pre-filtered air 54 arriving through the self sealing bellows 60, in conjunction with a partial hood bottom 330, which likewise receives this pre-filtered air 54. These hood portions, 326 and 330, are permanently bonded together which serve to direct all the pre-filtered air 54, through the "D" shaped inlet neck 329, as uniformly as possible, through a high efficiency particle arrestor filter 68, also briefly referred to as a high efficiency particle arrestor air filter, serving as a final filter 68, and to form the final filter air equalizing distribution plenum 333. This plenum 333, in which the pre-filtered air 54 has its flow equalized is of a size and shape that allows the complete air pressure to equalize before passing through the high efficiency particle arrestor air filter 68 which maintains airflow within + or −10% across the entire face of the high efficiency particle arrestor air filter 68 filtering the air into the final clean airflow 34. Internal equalizing air distribution baffles 332 are optimally and selectively positioned and secured within the hood top assembly area 328 to further insure the uniform distribution of the pre-filtered air 54 into and through the high efficiency particle arrestor air filter 68.

To protect and to help support the high efficiency particle arrestor final air filter 68, a grill 334 is placed downstream to this final filter 68. In addition, the grill 334 is designed to distribute the air passing through this final filter 68. Preferably, the structure of the grill 334 only occupies forty percent of its total cross-sectional area, leaving sixty percent for the flow of clean air 34. This size and structure of the grill 334, creates the least turbulence of the clean air flow 34, while maintaining the safety required to prevent a person's finger or fingers from touching the final filter 68, which could destroy the integrity of the final filter 68. This grill 334, made of perforated metal has a electrical grounding conductor 335, as indicated in FIG. 23, extending to a ground, not shown, via ground wires incorporated into this clean air supply assembly 30. This grounding system eliminates the possibility of any static electrical charge, that might have been built up during movement of the traveling pre-filtered air 54 and the final filtered clean airflow 34 through the clean air supply assembly 30, from carrying a static electrical charge, when leaving the top filter hood assembly 66. The grill 334 is the last component the clean airflow 34 passes through before leaving this clean air supply assembly 30.

If such a static electrical charge, even a slight one, were to remain, it could create problems, when existing around vulnerable electronic objects. Even a very low static electrical charge can destroy electronic chips or other objects, seriously interfering with the production of quality electronic components.

An attachment is provided on this clean air supply assembly 30, not shown, to snapably receive operator static wrist straps and ground cords used during manufacturing processes, to thereby integrate the grounding of this clean air supply system 30, to the complete grounded circuit of the entire work area.

To hold the grill 334 and a high efficiency particle arrestor final air filter 68 in place, a filter hood bezel assemble 336 is secured to the top hood housing 326, while partially surrounding the final filter 68 and the grill 334. The preferred way of securing the filter hood bezel 336 to the top hood assembly 66, utilizes a transverse receiving channel 340, or flange 340, integrally formed on the partial lower hood bottom 330, which is pendently bonded to the top hood filter housing 326, at the backside edge away from the front face of the filter 68, which receives a complementary fitting backside positioned transverse receiving channel 348, or flange 348, also called an upper filter hood bezel back attachment lip extension 348, positioning of the upper filter hood bezel assembly 336, thereby creating a hinge like positioning of the filter bezel assembly 336 on the hood bottom 330, also called the lower air intake hood housing 330. Then, when this filter hood bezel assembly is pivoted into place, screw fasteners 341 are used to removably finish the assembly of this hood bezel 326 and the partial hood bottom 330, and thereby complete the overall assembly of the top filter hood assembly 66.

During this assembly of the top filter hood assembly 66, a sealing gasket 338 is placed over the upstream edges and corners of the final filter 68, which is a high efficiency particle arrestor air filter or an equal one, as shown in FIGS. 11, 22, 23, 23A and 24, and compressed into the sealing receptacle socket 339 thereof.

The Preferred Configurated Material, and Installation, of the Sealing Gasket, Preferably Prepositioned about the High Efficiency Particle Arrestor Air Filter, Insuring that All the Airflow Goes Through the Filter FIG. 23 illustrates the partial cross sectional view of the unassembled top filter hood assembly 66 having the top hood assembly 326, the; high efficiency particle arrestor air filter 68 the sealing gasket 338; the high efficiency particle arrestor air filter retaining frame assembly 331; the filter hood bezel assembly 336. In FIG. 23A a partially exploded detailed cross sectional area, before the assembly of components is illustrated, centering on the pre-positioning of the sealing gasket 338. After assembly the position of the gasket 338 is illustrated in FIG. 24, as the assemblies are then in the secured latch positions.

The top filter hood assembly 66 or top hood assembly 94 has the sealing gasket receptacle 339, molded into the top hood housing 326, to accept the sealing gasket 338 positioned about the filter 68. This high efficiency particle arrestor air filter-sealing gasket receptacle 339 is shaped to allow three positions of its surfaces at locations 411, 413, and 415 to meet positions of the surfaces of the sealing gasket 338 at locations 410, 412, and 414, thus providing three locations of independent sealing for the high efficiency particle arrestor air filter 68 with an adequate sealing function at each circumferential sealing location. This secure level of high efficiency particle arrestor positive air filter sealing is required and preferred because of the diversified types of clean airflow 34 work area applications, in which this clean air supply assembly 30 will most likely be utilized, and the filter 68 will be readily changed quite frequently.

The sealing gasket material is a manufactured extrusion with skinned outer surfaces around the entire outside circumferential shape, thereby including the sealing surface locations 410, 412, and 414 and the locations where the sealing gasket 338 contacts the filter sealing gasket attachment surfaces 406 and 408, as shown in FIG. 23A. This sealing gasket 338 is preferably attached to the outer inlet edge of each HEPA/ULPA filter 68. The positive filter sealing gasket 338 is arranged and installed in one final contiguous piece around all four outer inlet edges of the high efficiency particle arrestor air filter 68 as the two ends of the sealing gasket material are permanently bonded together to form a secure filter seal joint. The interior of sealing gasket 338 is a soft inter-closed-cell foam design, thus allowing reduced compression pressures to be applied during the clamping in place of the final filter 68, when sealing gasket 338 is positioned to create an absolute secure positive air seal 338 without distorting the top filter hood housing 326. This sealing gasket 338 is preferably affixed at the factory on every high efficiency particle arrestor air filter 68 for easier filter replacement operations.

As the high efficiency particle arrestor air filter 68 is first being positioned into the high efficiency particle arrestor air filter sealing gasket receptacle 339 the outer sides of the sealing gasket at location 414 first make contact with the angled alignment surface 416 of the top filter hood assembly 66 and 94, which guides the gasketed high efficiency particle arrestor air filter 68 into the correct position for the compression and sealing phases of securing the gasketed high efficiency particle arrestor air filter 68. During the next portion of the gasketed high efficiency particle arrestor air filter 68 entry into the receptacle, the outer side of the sealing gasket 338 slips along the receptacle angled alignment surface 416 to the vertical side wall sealing surface 415, which is then taller than the non-compressed depth of the un-compressed filter gasket 338 for providing for a assured surface contact. Then when the filter sealing gasket 338 is slightly compressed, an initial seal is created around the outer perimeter of the gasketed high efficiency particle arrestor air filter 68.

In the final phase of the gasketed high efficiency particle arrestor air filter 68 insertion process, in the upward direction, the high efficiency particle arrestor air filter sealing gasket 338 at its surface location 410 is compressed when pressure is applied, during clamping, on the filter frame assembly 331 in the same upward direction, as this frame assembly 331 fits snuggley around the four outside outlet edges and the four side surfaces of the high efficiency particle arrestor air filter 68. As the frame assembly 331 moves upwardly, pressure applies to the sealing gasket 338, which because of it design, compresses and expands filling the receptacle cavity 339 across the receptacle surface 411. As the sealing gasket surface location 410 is being compressed, the gasket material expands towards the outer corner 413 of the receptacle 339 and fills this corner portion 413 of the cavity or receptacle 339. When the sealing gasket 338 is in the final compression stage, the last portion of the sealing gasket expands more tightly against the side wall 415 of the receptacle 339 of the top hood housing 326, thereby creating the third sealing location or position of the gasket sealing system providing three sealing locations creating what is referred to as safety seal redundancy.

The inner wall surface 418 of the receptacle 339 at the top hood housing 326 becomes the stopper for any potential retaining frame assembly 331 deformation of the high efficiency particle arrestor air filter 68 due in part to possible long filter frame side walls at the assembly 331 without bracing, possibly distorting and causing a disruption of the overall sealing function of the filter sealing gasket 338.

The filter-retaining frame assembly 331 is manufactured so that it will fit snuggley around and keep the high efficiency particle arrestor air filter 68 centrally secured. It also provides a filter retaining structure 337 to permanently attach the perforated safety static collection grill 334 and thereby stiffening the filter retaining frame assembly 331. The filter retaining frame assembly 331 has, around the outside, a number of compression latches 342 that connect to the corresponding latching hooks 344, which are installed onto the top hood housing 326. When this combination of the filter frame assembly 331; is completely installed and latched around all four sides of the filter, then the sealing system of the high efficiency particle arrestor air filter 68 is completed.

The Filter Hood Bezel Housing Provides for; Easy Filter Replacement Access and Cleaning, Shroud and Light Mounting The filter hood bezel assembly 336, when attached to the air outlet side of the filter top filter hood assembly 66 and 94, creates an overall smooth outer surface to ease operational contaminate cleaning, provide a lighting receptacle retaining housing, and a outer surface for the shroud attachment strip.

This filter hood bezel assembly 336 is attached at its front and back ends only thus providing easy filter replacement. At the back of the filter bezel assembly 336 there is a integral lip extension 348 which extends outwardly. During the installation with the top filter hood housing 326, this lip interlocks with the receptacle slot 340 in the lower hood intake housing 330, which previously has been permanently attached to the top filter hood housing 326. The front of the filter hood bezel assembly 336 is then rotated upwards towards the front of the hood top housing 326 and secured with two, or more front bezel screw fasteners 341, depending on the size of top hood assembly 66 and 94.

The Many Positions of the Filter Head Assembly

The top filter hood assembly 66 is then ready for angular adjustment 75 thereof, utilizing the tilt adjustment assembly 62 for controlled, stoppable, movement through ninety degrees, from vertical to horizontal during clean air supply functions. Then for handling and storing, and some operations, the top filter hood assembly 66 undergoes continued angular adjustment from horizontal position, with the clean airflow 34 downward, to a upward vertical position with the clean airflow 34 horizontal, thereby completing the angular adjustment through a total of one hundred eighty degrees.

Also the top filter hood assembly 66 is raised and lowered utilizing the up and down positioning of the adjustable height telescoping structural tube 58 relative to the supporting tower hollow housing 56. Moreover by rotating this tube 58 relative to tower hollow housing 56, within the limits determined by the tube rotational limit pin 346, also called the tube rotational limit pin 346, located inside the tube 58, the filter hood assembly 66 is rotatable about a vertical axis, as shown by motion arrows in FIGS. 2, 3, 4, and 22 and the limit pin 346 in FIG. 16. The rotational limit pin 346 contacts a respective side of the supporting guide block 216 to prevent a full revolution, in either direction, of the tube 58 relative to the tower hollow housing 56 as illustrated in FIG. 16. This limited articulate movement insures that no circuitry will be overly twisted.

A Depending Plastic Shroud Supported by the Top Filter Hood Assembly

When necessary, to eliminate currents of potentially contaminated surrounding air 44, which otherwise could cause unwanted mixing with the clean airflow 34, a depending plastic shroud 84 is secured about the hood bezel assembly 336 of the top filter hood assembly 66/top filter hood housing assembly 94, as shown in FIG. 22, with respect to the top filter hood assembly 66.

The outer surface of the filter hood bezel assembly 336 provides a smooth outer surface to secure a Velcro type hook strip 394, to interlock with a Velcro locking loop strip 395 which is secured to a plastic work shroud 84, of what ever size and shape is required. As shown in FIG. 22 the plastic shroud 84 can be preferably sized to surround a work supporting tray 88, or other device such as a hospital bed, and extend down below this tray 88 or other device, thereby eliminating any interference with outside air currents 398 of surrounding air 44 occurring outside of the plastic shroud 84. In this way, the clean airflow 34 leaving the high efficiency particle arrestor air filter 68, remains so, while flowing to, through, and beyond the specific locale 70, such as at the tray 88, or other device, in respect to the associated area or volume, where clean airflow 34 is specified. The plastic shroud 84 is also referred to as a curtain or drape. This plastic shroud 84 can also be used when no tray or other support is being utilized.

When a full surrounding plastic shroud 84 is used to avoid any interference with outside air currents 398, then the clean airflow 34 leaving the top filter hood assembly 66 continues to be certifiable clean air within the surrounding plastic shroud 84. When the top filter hood assembly 66 is positioned to extend outwardly, as far away as possible from the adjustable height telescoping structural tube 58, and the plastic shroud 84 extends down near floor level 40, so the flow of certifiable clean air 34 continues to flow to nearly the floor level 40.

Electrical, Electronic Circuits, Components, Microprocessor, and Selective Controls In respect to embodiments of this clean air supply assembly 30, various arrangements of electrical, electronic, circuits, components, microprocessor, and selective controls are utilized. In a block diagram 361, a very complete arrangement is illustrated in FIG. 18, centering around the use of a microprocessor control unit 350. Most of the operators during most of the operating times will be using the front panel controls 352 and displays 354 located on the front of the tower hollow housing 56, as illustrated in FIGS. 1, 11, and 22, and as shown in this FIG. 18. However, there are also remote control and displays 356, and additional remote control and displays 358 made available. Moreover, an external computer system 360 is made available.

Utilizing an AC power source 362 of preferably a one hundred and ten volt alternating current, i.e. 110 AC electrical power, filter by an AC line filter 364, the clean air supply assembly 30, in a very complete embodiment is operated as the front panel controls 352 signal the microprocessor control unit 350, which in turn directs signal, via low direct current voltage circuitry 366, to an alternating current power distribution and digital switching unit 368. These signals are used selectively to: switch the alternating current power on and off 370; to control the motor speed 372 of the blower motor 374; to control the raising and lowering direction 376 of the raising and lowering electric motor 208, when used. The filtered alternating current power 378 is directed through the 110 AC circuitry 380 to the AC power distribution and digital switching unit 368, and selectively beyond to the blower motor 374 and to the electric motor 208 used in raising and lowering the adjustable height telescoping structural tube 58, to thereby raise and lower the top filter hood assembly 66.

The AC power distribution and digital switching block 368 also serves a lamp lighting system 386 on/off low voltage control signal 389 from the microprocessor control unit 350 that controls the switched AC current power to a lighting low voltage power supply 381.

The microprocessor unit 350 receives low voltage AC current power 369 from the AC power distribution and digital switching unit 368. The microprocessor unit 350 has internal circuitry to convert the low voltage AC power to all the low voltage DC power necessary for operating and controlling the overall electrical system utilized in the clean air supply assembly 30.

The switched on incoming AC power, from the AC power line 362 is directed to the AC power distribution block 368, the operation of this AC power distribution and digital switching block 368 is controlled by the microprocessor control unit 350 sending DC signals via circuits 366. The direct current is DC, signals directs the AC power distribution block 368 to deliver low voltage electrical DC power to the lighting system via the supply 381. The switched DC power via circuitry 366 goes to a lighting dimmer unit 382 that controls the lamp intensity 390 in discrete steps controlled by switched digital commands received via circuitry 366 from the microprocessor control unit 350. The digitally DC controlled output of the light dimmer system 382 supplies power to the lighting system 386 of the optional hood lights 388, shown in FIGS. 1, 2, 3, 6 and 20, located at the respective corners of the top filter hood assemblies 66 and 94. Lights 388 direct lighting in the same direction as the direction of the clean airflow 34 as shown in FIG. 20.

Electrical connections in the lighting circuit going to the lights 388 are made by lower electrical spring copper clip assembly 385 and their corresponding copper contact plate assembly 384, as shown in FIG. 19. This electrical contact system automatically disconnects the adjustable low voltage DC power to the lights 388 when the top filter hood bezel 336 is opened by the operator for high efficiency particle arrestor air filter 68 replacement. The copper spring clip assemblies 385 are mounted upon a electrical contact mounting plate 345 that is securely fastened to the filter hood bezel assemblies 336. The mating electrical copper contact plate assemblies 384 are securely fastened to the top hood assembly 326 within small recesses in the molded top hood assembly 326 and electrical contacts, not shown, are soldered to respectively to their backside, not shown, and are sealed in place by using an epoxy like containing material, not shown. This epoxy material securely holds those electrical contacts and also the electrical contact plates 384 in place and also provides a complete air seal between these electrical contact plate assemblies 384 and top hood housing 326.

Further References to the Components and the Operation of Specific Embodiments of Clean Air Supply Assemblies The backward inclined impeller 162 via the electric motor 374 thereof, also referred to as the blower motor 374, is operated to preferably move up to a filter facial velocity of two hundred feet per minute, per square foot of filter area of clean air through an embodiment of this clean air supply assembly 30.

When using, for an example, a twenty four inch by twenty four inch, i.e. 24" by 24", high efficiency particle arrestor air filter 68, the clean air is directed in a chosen direction, selected from many available directions, with a selectable face velocity, not to exceed 200 fpm, to thereby produce an ultra clean air zone or volume location 32, slightly narrowing, while extending out to approximately six feet, when no shroud 84 is utilized.

The safety static collection grill 334 of the top filter hood assembly 66 is electrically connected, via a conductor 335, shown in FIG. 23, to a ground terminal, not shown, to reduce the potential of any static electrical charge build up.

Low voltage touch pad controls are used in respect to the front panel controls 352 to reduce possibility of receiving a static electrical charge shock, and to facilitate the easy sterilization of this clean air supply assembly 30.

When enlarged top filter hood housing assembly 94 is used, the clean air velocities are slightly decreased, while the clean air flows through larger cross-sectional filter 68 areas.

When lower noise levels are wanted and/or delicate operations are being undertaken, the electric blower motor 374 is run at a slower speed, being often adjusted downwardly to produce only 200 cfm of the pre-filtered air 54 leaving the final filter face 68.

When the clean air supply assembly 30 is arranged, as shown in FIG. 10, with the top filter hood assembly 66, positioned horizontally, to thereby direct the clean air 34 directly downward to and beyond a work bench 399, or similar device, the clean air flow remains laminar. Also the quality of the cleaner air flow remains very clean down to where the air 38 is being taken in horizontally into the front prefilter assembly 48, above the floor or ground level 40, to pass through the front air intake entry 110 of the lower hollow housing 50 after being prefiltered as shown in FIG. 11.

Whenever a depending plastic shroud 84 is arranged about a top filter hood assembly 66/top filter hood housing assembly 94, the clean air flow 34, under positive pressure, is enhanced in quality and in effective volume, because of the elimination of the otherwise interference of outside air currents 398.

Also when a plastic shroud 84 is used, it is draped over a portion of a larger piece of equipment, so the draped portion can be worked on, surrounded by clean air 34, under positive pressure, flowing past this portion of the equipment which is confined within the shroud 84.

Also when a plastic shroud 84 is used, while arranged at an angle to direct clean air 34 diagonally over a work area, particles are prevented form otherwise dropping down onto the work area.

When the clean air supply assembly 30 has the top filter hood assembly 66 raised very high, a person standing up can work on equipment, materials, circuits, components, etc. supported on work bench 399 or a work tray 88, or supported on their own tall frame for assembly.

By utilizing the rotation of the adjustable height telescoping structural tube 58, the top filter hood assembly 66/top filter hood housing assembly 94 can be moved in either direction approximately through an arc of three hundred and forty five degrees, i.e. 345 degrees. This arcuate movement permits the placement of a top filter hood assembly 66/top filter hood housing assembly 94 on the backside locale 400 of the clean air supply assembly 30 to improve the air quality in this backside locale 400, as shown in FIG. 9. Because the tower hollow housing 56 and the adjustable height telescoping structural tube 58 are nearer this backside locale 400, when a top filter hood assembly 66/top filter hood housing assembly 94 is so positioned in this backside locale 400, then either of them, 66 or 94, extends further over a given work area in an ultra clean zone 32 located in this backside locale 400. A person located in this backside locale 400 experiences a significant lower operational sound, because the internal noises are largely transmitted out through the front pre-filtered assembly 48, where the surrounding air 44 is being taken in for pre-filtering.

Preferably high intensity lights 388 operated by using low voltage power, are arranged to be canted slightly inward from the four corners of the filter hood bezel assembly 336, as an optional lighting system 386, thereby avoiding the creation of any shadows in a selected working specific locale 70, where clean airflow 34 is required or specified. The high intensity lighting system 386 also offer a means to temporarily attach colored lenses to the lights 388 which allow certain light wave lengths to be filtered out as desired.

Preferably, when many selections of the overall height are to be made during relative short periods of time, the optional electrical power lift assembly 204, used in moving the adjustable height telescoping structural tube 58, up or down, is included in an embodiment of this clean air supply assembly 30.

When a powered lift 204 is not used, a shaft, similar to the upright drive screw shaft 212, is used, but it is not threaded, to guide a supporting block 216, to in turn guide the adjustable height telescoping structure tube 58, while it is kept within the tower hollow housing 56.

In respect to the interior size of the lower hollow housing 50, there is no obstruction in most directions from the interior powered air moving assembly 52, and essentially the backward inclined impeller 162 thereof, for a distance of at lease 1.3 times the diameter of the backward inclined impeller 162 and the surrounding open volume and the continuation of an unobstructed flow path of the air being filtered. During operations of this clean air supply assembly 30, there is no stalling of the airflow, and the plenums are always pressurized.

Also this lower hollow housing 50 has, in as many places as practical, sound absorbing-lining material 402, preferably made of a three quarters of an inch thick plastic foam material having a skin-like coating to avoid the collection of bacteria. In other places, such as the interior side of the air intake baffle 146, sound dampening or sound attenuation covering material 404 is used, which is preferably made of a one eight of an inch thick plastic foam material. Also to reduce sound and vibrations, rubber or rubber-like spacer vibration gasket materials 166 are used when mounting the interior powered air moving assembly 52 in the lower hollow housing 50.

The pre-filter 142 preferably has a cover made of polyethylene type fiber arranged as a bag, and inside this bag is the carbon impregnated scrim material.

In respect to electrical wiring, wherever a wire enters or leaves an airflow plenum, air-sealing grommets are installed.

When the adjustable height telescoping structural tube 58, is being moved upon the operation of the electric lift motor 208, the electrical circuit includes respective travel up and down limit sensors.

In reference to the supporting work tray 88, preferably it is arranged: to be removed conveniently upon the operation of a pin release mechanism, not shown; to be pivoted out of the way; an/or to be installed by utilizing a clamping assembly, which surrounds a portion of the tower hollow housing 56.

In respect to all the embodiments of this clean air supply assembly 30, a person utilizing a respective embodiment has many options of how he or she will arrange the components thereof, and of how he or she will control the speed of the clean air supply, and of how he or she will direct the clean air paths to, around, and past specific locales 70, where ultra clean air is required.

What is claimed is:

1. A rollably positioned, passable through doorways, adjustably directable clean air supply assembly, for use in any weather controlled environment, which directs a controlled amount of clean grade air through an adjustably oriented top hood assembly which contains a sealed final filter that filters the air and allows the discharge of the air at minimal-eddy creating air velocities for improved air quality levels, which creates certifiable cleanrooms, clean zones, improved recirculated air quality within an given area, where an activity is being undertaken, which requires very clean air per strict specifications, comprising:

a) a lower hollow housing serving as a plenum to receive, near floor level, horizontally flowing air, through an entry in the front thereof and to discharge, at an exit in the top thereof, vertically flowing air, and also serving as a support for a front pre-filter assembly, an interior powered air moving assembly, a bottom rollable support assembly, and a tower housing, serving in turn as a plenum to receive air flowing through the exit in the top of this lower hollow housing;

b) a front pre-filter assembly positioned on the lower hollow housing in front of the entry thereof to pre-filter the incoming room air;

c) an interior powered air moving assembly positioned in the lower hollow housing and supported thereby, to draw air in through the pre-filter and to redirect the pre-filtered air up through the exit of this lower hollow housing, serving as a plenum;

d) a bottom rollable support assembly secured to the lower hollow housing at the bottom thereof;

e) a tower hollow housing serving as a plenum to receive, guide and discharge the pre-filtered air flowing up through the exit in the top of the lower hollow housing, and being firmly supported by the lower hollow housing, and also serving as a support for: a telescoping structural tube, which in turn serves as a plenum to receive the pre-filtered air leaving the tower hollow housing; also for an adjustable positioning subassembly used in maintaining the selected telescoping height and any partially rotated position of a telescoping structural tube; and also for an electrical control subassembly utilized in selectively operating the interior powered air moving assembly;

f) a telescoping structural tube serving as an adjustable height plenum to receive pre-filtered air leaving the tower hollow housing and to direct this air upwardly, while being movably supported on the tower hollow housing for up and down adjustments and partial rotary adjustments, and also serving as a support both for a tilt adjustment assembly, used in arcuately moving, stopping, and holding, a top filter head assembly, and for a self-sealing bellows surrounding a tilt adjustment assembly;

g) an adjustable positioning subassembly used in determining the telescoping height of the telescoping structural tube serving as an adjustable height plenum and thereby serving in changing the height and any partially rotated position of a top filter head assembly;

h) an electrical control subassembly utilized in selectively operating the interior powered air moving assembly;

i) a tilt adjustment assembly secured in part to the telescoping structural tube and also secured in part to a top filter head assembly, and selectively adjusted to arcuately move, stop, and/or hold a top filter head assembly;

j) a self-sealing bellows, serving as a plenum, surrounding the tilt adjustment assembly and secured at the lower end thereof to the telescoping structural tube, and arranged to be secured at the higher end thereof to a top filter head assembly, to guide the flow of the pre-filtered air around the tilt adjustment assembly enroute to a top filter head assembly;

k) a top filter head assembly secured to the tilt adjustment assembly and also to the bellows, and having a high efficiency particle arrestor type filter, to receive the pre-filtered air from the bellows, and to cleanly filter this pre-filtered air, before this finely cleaned air is specifically directed in a desired flow path through a designated volume, where specified clean air is needed.

2. A rollably positioned, passable through doorways, adjustably directed clean air supply assembly, as claimed in claim 1, wherein the top filter head assembly comprises, in addition to the gasketed high efficiency particle arrestor type filter: a hood top contoured to receive the pre-filtered air in a ninety degree direction; a frame for the high efficiency particle arrestor filter and with the filter fitted partially into the hood top to receive, to filter, and to positively seal the final filter and pass on the pre-filtered air; a grill fitted adjacent the high efficiency particle arrestor filter, serving to hold and to protect the filter, and to further disperse the flow of the filtered air; a hood bezel fitted about portions of the high efficiency particle arrestor filter and the frame thereof and the grill, and secured to the hood top; and a partial hood bottom contoured to receive the pre-filtered air arriving through the bellows and distribute this air into the hood top, when this partial hood bottom is secured to the hood top, and when the self-sealing bellows at the top thereof is secured to this top filter head assembly and to the partial hood bottom.

3. A rollably positioned, passable through doorways, adjustably directed clean air supply assembly, as claimed in claim 1, wherein the tilt adjustment assembly comprises, in turn:

a) spaced vertical support arms, having shaft holes, secured to the telescoping structural tube plenum assembly;

b) a bolt serving as a shaft to be extended through the shaft holes of spaced vertical support arms;

c) a pivot bracket for rotation about the bolt serving as a shaft; and d) at least one positioning assembly for moving and holding the pivot bracket to selected angular positions, comprising, in turn, spaced fiber friction plates arranged along the bolt serving as a shaft; spaced steel friction plates located in the spaces between the spaced fiber friction plates and also arranged along the bolt serving as a shaft, with the steel friction plates interfitting with the pivot bracket to rotate with it; a torsion spring having both a coil portion thereof fitted about the bolt, serving as a shaft and an extending arm for movably contacting all the steel friction plates to restrain them as a group, when this group is frictionally opposing rotary movement of the pivot bracket; a bushing both for positioning about the bolt, serving as a shaft, for receiving the spaced fiber friction plates and the spaced steel friction plates; a mandrel for positioning about the bolt, serving as a shaft, and fitting into the coil portion of the torsion spring; belleville washers serving as conical spring washers, fitted about the bushing fitted about the bolt, serving as a shaft, and positioned at the respective sides of the overall grouping of the spaced fiber friction plates and the spaced steel friction plates; compression washers for placement over the bolt, serving as a shaft, and one of them is located between the pivot bracket and one of the spaced support arms, and the other one of them is located between the belleville washer and one of the spaced steel friction plates; a compression cap for placement over the bolt, serving as a shaft, and located adjacent to one of the belleville washers; a washer for placement over the bolt, serving as a shaft, and located adjacent to the compression cap; a self locking tension adjuster nut for placement over the bolt, serving as a shaft, and located adjacent the washer to hold together this tilt adjustment assembly, when the assembly thereof about the bolt, serving as a shaft, has been completed, whereby the pivot bracket is controllably adjusted from a vertical position, through selectable angular positions, to a horizontal position.

4. A rollably positioned, passable through doorways, adjustably directed clean air supply assembly, as claimed in claim 1, wherein the tilt adjustment assembly is arranged in a hood counterweight tension spring assembly, comprising:

a) a cable secured at one end to the top filter head assembly and secured at the other end to at least one coiled spring;

b) a coiled spring secured at one end to the cable and secured at the other end to the adjustable height telescoping tube, at a lower portion thereof and c) a cable direction change assembly having a cable pulley wheel to receive and to guide the cable, and a cable pulley wheel mounting bracket which is secured to the adjustable height telescoping structural tube, at the top thereof, and which rotatably supports the cable pulley wheel.

5. A rollably positioned, passable through doorways, adjustably directed clean air supply assembly, as claimed in claim 1, wherein the interior powered air moving assembly comprises, in turn:

a) a mounting structure secured to the lower hollow housing;

b) an electric motor shaft secured to this mounting structure;

c) an armature secured to this electric motor shaft;

d) a backward inclined impeller rotatably positioned about the electric motor shaft; and e) an electrical coiled field secured to this impeller to complete an electrical motor which is thereby positioned inside the backward inclined impeller, and secured to the mounting structure, to rotate the backward inclined impeller to draw air in axially and to discharge air radially, as the air passes through the lower hollow housing.

6. A rollably positioned, passable through doorways, adjustably directed clean air supply assembly, as claimed in claim 1, wherein the front pre-filter assembly comprises in turn:

a) a filter door housing with intake louvers;

b) a charcoal pre-filter fitted within the filter door housing;

c) a filter retainer holding the charcoal pre-filter within the filter door housing; and a d) baffle positioned within lower hollow housing to redirect air leaving the charcoal pre-filter around this baffle before entering into the interior powered air moving assembly positioned in the lower hollow housing.

7. A rollably positioned, passable through doorways, adjustably directed clean air supply assembly, as claimed in claim 1, wherein the bottom rollable support assembly comprises, in turn:

a) horizontal extending legs secured to the lower hollow housing at the bottom thereof; and b) casters secured to and depending from the legs at the ends thereof.

8. A rollably positioned, passable through doorways, adjustably directed clean air supply assembly, as claimed in claim 1 comprising, in addition, a surrounding curtain attached to the top filter head assembly, and depending therefrom to provide, in effect, a clean room below the top filter head assembly.

9. A rollably positioned, passable through doorways, adjustably directed clean air supply assembly, as claimed in claim 2, comprising, in addition, a surrounding curtain attached to the hood top of the top filter head assembly, and depending therefrom to provide, in effect, a cleanroom below the top filter head assembly.

10. A rollably positioned, passable through doorways, adjustably directed clean air supply assembly, as claimed in claim 2, comprising, in addition, at least one lighting fixture and circuitry thereof installed in the hood top to provide lighting below this top filter head assembly.

11. A rollably positioned, passable through doorways, adjustably directed clean air supply assembly, as claimed in claim 1, comprising, in addition, an electrical power supply cord wrapping assembly secured to the lower hollow housing.

12. A rollably positioned, passable through doorways, adjustably directed clean air supply assembly, as claimed in claim 1, comprising, in addition, bearing material tapes arranged at spaced locations within the tower hollow housing to provide bearing surfaces for the up, down, and around, movements of the telescoping structural tube.

13. A rollably positioned, passable through doorways, adjustably directed clean air supply assembly, as claimed in claim 1, comprising, in addition, a hand operated braking and holding assembly mounted on the tower hollow housing, at the top thereof, used to supplement the adjustable positioning subassembly, and used in place of the adjustable positioning subassembly, when moving the telescoping structural tube, serving as an adjustable height plenum, to another relative height location with respect to the tower hollow housing, and then holding it in place by the created braking force.

14. A rollably positioned, passable through doorways, adjustably directed clean air supply assembly, as claimed in claim 1, wherein the lower hollow housing serving as a plenum has an internal volume which is sized to provide a radial volume about the interior powered air moving assembly, which extends therefrom in any radial direction at least 1.3 times the diameter of the interior powered air moving assembly.

15. A rollably positioned, passable through doorways, adjustably directed clean air supply assembly, as claimed in claim 1, wherein the lower hollow housing serving as a plenum has a sound absorbing plastic foam lining material, in turn having a skin like coating to avoid the collection of bacteria.

16. A rollably positioned, passable through doorways, adjustably directed, clean air supply assembly, as claimed in claim 6, wherein the baffle has a sound damping covering material.

17. A rollably positioned, passable through doorways, adjustably directed, clean air supply assembly, as claimed in claim 6, wherein the charcoal pre-filter has a covering material of polyethylene fiber serving as a bag, and carbon impregnated scrim material arranged within this covering material.

18. A rollably positioned, passable through doorways, adjustably directed, clean air supply assembly, as claimed in claim 6, wherein the filter door is curved and the intake louvers thereof are arranged on an angle, whereby the sound waves emitting from the rotating backward inclined impeller are deflected to reduce the sound heard about the exterior of this clean air supply assembly.

19. A rollably positioned, passable through doorways, adjustably directed clean air supply assembly, as claimed in claim 1, wherein the lower hollow housing serving as the plenum, on the back thereof has an electrical power supply cord receiving and coiling assembly.

20. A rollably positioned, passable through doorways, adjustably directed clean air supply assembly, as claimed in claim 1, wherein the telescoping structural tube serving as the adjustable height plenum, has an interior located abutment to contact an abutment associated with the tower hollow housing, serving as a plenum, to insure the rotation of the telescoping structural tube cannot exceed three hundred and sixty degrees, when it is being supported by the tower hollow housing.

21. A rollably positioned passable through doorways, adjustably directed clean air supply assembly, as claimed in claim 2, wherein the grill is a punched out metal grill, wherein the punched created openings comprise sixty percent of the total overall grill area and these openings are formed to reduce any turbulence of the departing filtered air, and are sized small enough to bar the entry of a person's finger, and this grill is grounded to conduct away the electricity, which otherwise could cause a subsequent static electrical discharge.

22. A rollably positioned, passable through doorways, adjustably directed clean air supply assembly, as claimed in claim 1, wherein the bottom rollable support assembly, which is secured to the lower hollow housing, is kept low in elevation so this support assembly, as necessary, may be extended under tables, cabinets, and other furniture.

23. A rollably positioned, passable through doorways, adjustably directed clean air supply assembly, as claimed in claim 2, having a sealing gasket positioned between the hood top and the frame of the high efficiency particle arrestor filter, at the respective outside edge portions of the hood top and the frame of the filter.

24. A rollably positioned, passable through doorways, adjustably directed clean air supply assembly, as claimed in claim 5, having rubber materials used in mounting the interior powered air moving assembly to isolate harmonics and vibrations.

25. A rollably positioned, passable through doorways, adjustably directed clean air supply assembly, as claimed in claim 5, wherein the interior powered air moving assembly, having the backward inclined impeller, is arranged so no airflow stalling occurs and the plenums are always well pressurized.

26. A rollably positioned, passable through doorways, adjustably directed clean air supply assembly, as claimed in claim 1, having an O-ring sealing assembly in the tower hollow housing, wherein the O-ring and receiving groove thereof, is positioned so the O-ring bears against the exterior of the telescoping structural tube at all times during the raising and lowering of this tube, which in turn causes the raising and lowering of the top filter head assembly.

27. A rollably positioned, passable through doorways, adjustably directed clean air supply assembly, as claimed in claim 1, wherein the adjustably positioning subassembly comprises an adjustable clamping ring positioned internally in the tower hollow housing, near the top thereof, and having tabs thereof extending radially outwardly through an opening in the tower hollow housing, each tab having a receiving hole; a threaded rod sidably positioned through the receiving holes of the tabs; a positioning nut threaded on the threaded rod beyond the tabs; and a cammed toggle lever subassembly mounted for pivotable movement on the tower hollow housing, and pinned to the threaded rod, whereby upon operation of this adjustably positioning subassembly, the telescoping structural tube is either freed to be moved up or down or around, or is clamped to stay in a selected height and direction position relative to the tower hollow housing, and thereby be determining the position of the top filter head assembly.

28. A rollably positioned, passable through doorways, adjustably directed, clean air supply assembly, as claimed in claim 1, wherein the adjustably positioning subassembly comprises:

a power housing secured to tower hollow housing near the bottom thereof;

an electric motor secured to this power housing;

a drive shaft gear assembly secured to this power housing and connected to the electric motor;

an upright drive screw shaft secured to the drive shaft gear assembly;

a bushing secured to the tower hollow housing to receive the upright drive screw shaft, at the top thereof;

a supporting guide block having a threaded central hole threadably receiving the upright drive screw shaft, and also having a top restrictive entry arcuate receiving channel to receive a bottom complementary sized portion of the telescoping structural tube, whereby this tube always remains, in part, within the tower hollow housing; and an upright guiding channel positioned within the tower hollow housing to guide the up and down movement of the supporting guide block while preventing the rotation thereof;

whereby, when the electric motor is operated and the upright drive screw shaft is then being rotated, the supporting guide block, depending on the rotation of this shaft, will either be raising or lowering the telescoping structural tube, and consequently, either be raising or lowering the top filter head assembly.

29. A rollably positioned, passable through doorways, adjustably directed clean air supply assembly, as claimed in claim 28, wherein the adjustably positioning subassembly also comprises: limit switches and their circuitry for their respective contacts with the supporting guide block, at the top or the bottom of the travel of the supporting guide block, within the upright guiding channel, to stop the supply of electrical power to the electric motor, when either of these respective ends of travel are reached.

30. A rollably positioned, passable through doorways, adjustably directed clean air supply assembly, as claimed in claim 1, comprising, in addition, a resting support on the lower housing at the rear thereof to receive a depending portion of the top filter head assembly, when the tilt adjustment assembly has been utilized to position the top filter head assembly alongside the telescoping structural tube, and partially alongside the tower hollow housing, in an overall position of this clean air supply assembly, permitting the passage thereof through a doorway or other narrow passageways.

31. A rollably positioned passable through doorways, adjustably directed clean air supply assembly, as claimed in claim 1, wherein both the front pre-filter assembly, and the top filter head assembly, each have a filter protective member and a filter supporting member, which have respective integral hinge portions, whereby the filter protective members are pivoted to gain access to the respective filters.

32. A rollably positioned, passable through doorways, adjustably directed clean air supply assembly, as claimed in claim 31, wherein both the front pre-filter assembly, and the top filter head assembly, have spaced fastener assemblies for the repeated securement and release of the filter protective members, when their respective integral hinge portions are being utilized.

33. A rollably positioned passable through doorways, adjustably directed clean air supply assembly, as claimed in claim 1, wherein the tower hollow housing has spaced vertical interior bearing materials of ultra high molecular weight plastic, against which exterior portions of the telescoping tube slidably pass during the up and down movements and partial rotational movements of the telescoping structural tube, when being supported and retained by the tower hollow housing.

34. A rollably positioned, passable through doorways, adjustably directed clean air support assembly, as claimed in claim 1, wherein the tower hollow housing has an upstanding guiding rod and guiding channel assembly, and the telescoping structural tube has a supporting guide block, with a central hole to receive the upstanding guiding rod, and opposite sides to be sidably guided in the guiding channel, whereby the telescoping structural tube is controllably guided during the up and down movements thereof in respect to the tower hollow housing.

35. A rollably positioned, passable through doorways, adjustably directed clean air supply assembly, as claimed in claim 4, wherein the tower hollow housing has spaced vertical interior bearing materials of ultra high molecular weights, against which exterior portions of the telescoping tube sidably pass during the up and down movements, and partial rotational movements, of the telescoping structural tube, when being supported and retained by the tower hollow housing.

36. A rollably positioned, passable through doorways, adjustably directed clean air supply assembly, as claimed in claim 1, wherein the top filter head assembly has a lighting system comprising, in turn, lights, circuitry thereof, switches thereof, and electrical power thereof, for providing light in the work area through which the filtered air is being directed.

37. A rolably positioned, passable through doorways, adjustably directed clean air supply assembly, as claimed in claim 1, wherein the lower hollow housing, comprises, in addition, a receiving volume compartment to selectively receive weights of different sizes to counterbalance, for example, a larger size top filter head assembly.

38. A rollably positioned, passable through doorways, adjustably directed clean air supply assembly, as claimed in claim 1, wherein the electrical control assembly has finger touching manipulated controls thereof, in turn having an overall membrane sealed cover for convenient sterile cleaning.

39. A rollably positioned, passable through doorways, adjustably directed clean air supply assembly as claimed in claim 1, wherein the electrical control subassembly, in respect to wires entering or leaving plenums, has air sealing grommets around wires.

40. A rollably positioned, passable through doorways, adjustably directed clean air supply assembly, as claimed in claim 3, wherein the tilt adjustment assembly, in the at least one positioning assembly thereof, has notches formed along a portion of the circumference of the steel friction plates, and a ratchet follower to respectively contact these notches during the angular adjustments of this tilt adjustment assembly, whereby the person changing the angular position of the tilt adjustment assembly, and thereby changing the angular position of the top filter head assembly, both hears and feels the adjustments being undertaken.

41. A rolably positioned, passable through doorways, adjustably directed, clean air supply assembly, as claimed in claim 27, wherein the adjustably positioning subassembly also comprises, in addition:

a) an upright smooth shaft secured at the bottom and top thereof within the tower hollow housing;

b) a supporting guide block having a smooth central hole receiving the upright smooth shaft, and also having a top restrictive entry arcuate receiving channel to receive and to hold a bottom complementary sized portion of the telescoping structural tube, whereby this tube always remains, in part, within the tower hollow housing; and an upright guiding channel positioned within the tower hollow housing to guide the up and down movement of the supporting guide block, while preventing the rotation thereof.

42. A rollably positioned, passable through doorways, adjustably directed clean air supply assembly, as claimed in claim 8 comprising, in addition, a work supporting tray having multiple spaced air passageways arranged within the surrounding curtain.

43. A rollably positioned, passable through doorways, adjustably directed clean air supply assembly, as claimed in claim 42, wherein the work supporting tray is adjustably and removably secured to the tower hollow housing, allowing for the easy movement and storage of the clean air supply assembly.

44. A rollably positioned, passable through doorways, adjustably directed clean air supply assembly, as claimed in claim 7, wherein the casters of the bottom rollable support assembly have locks thereon to prevent unwanted movement of each caster.

45. A rollably positioned, passable through doorways, adjustably directed clean air supply assembly, as claimed in claim 1, wherein the top filter head assembly comprises, in addition, a filter gasket having an overall continuous surrounding body configuration, which:

a) fits on and around the high efficiency particle arrestor air filter;

b) has respective wings arranged at an overall ninety degrees;

c) has an interior ninety degree corner of the respective wings; and d) has the exterior of each wing formed on an arcurate contour creating a gradual increase in the thickness of each wing, reaching a maximum thickness, where the wings are joined at the locale, where the interior ninety degree corner is positioned throughout the entire filter gasket.

46. A rollably positioned, passable through doorways, adjustably directed clean air supply assembly, as claimed in claim 45, wherein the filter gasket is made by utilizing a length of a skinned softly compressible closed cell plastic foam extrusion arranged in an overall continuous surrounding body configuration which fits on and around the high efficiency particle arrestor air filter.

47. A rollably positioned, passable through doorways, adjustably directed clean air supply assembly, as claimed in claim 45, wherein the top filter head assembly has a hood top, and the hood top has an overall continuous receptacle which is sized to fully receive one respective wing of the filter gasket, when the wing is subsequently compressed, and to partially receive the other respective wing of the filter gasket, when the other wing is subsequently compressed.

48. A rollably positioned, passable through doorways, adjustably directed clean air supply assembly, as claimed in claim 47, wherein the overall continuous receptacle has a substantially rectangular cross section having:

a) an interior length arranged to be parallel to the high efficiency particle arrestor air filter at the corner thereof;

b) an interior length arranged perpendicular to the interior length arranged to be parallel to the high efficiency particle arrestor air filter, which extends for a perpendicular distance that is less than the original maximum thickness of the one respective wing of the filter gasket, which is subsequently fully received in the receptacle, when the wing is then subsequently compressed; and c) another interior length arranged substantially, perpendicular to the interior length arranged to be parallel to the high efficiency particle arrestor air filter, which extends for a perpendicular distance that is greater than the maximum thickness of the other respective wing of the filter gasket, which is not fully received in the receptacle, when the other wing is compressed in part.

49. A rollably positioned, passable through doorways, adjustably directed clean air supply assembly, as claimed in claim 48, wherein the overall continuous receptacle that has the other interior length that is substantially perpendicular to the interior length arranged to be parallel to the high efficiency particle arrestor air filter, has a portion of the other interior length arranged on an angle creating a tapered guiding wider entry to the receptacle, which is utilized when the high efficiency particle arrestor air filter is being installed on the top filter head assembly.

50. A rollably positioned, passable through doorways, adjustably directed clean air supply assembly, as claimed in claim 48, wherein the top filter head assembly has multiple clamping subassemblies spaced apart and utilized to secure the high efficiency particle arrestor air filter to the hood top, with the filter gasket being compressed, whereby there are multiple sealing strips between the top hood housing and the high efficiency particle arrestor air filter.

51. A rollably positioned, passable through doorways, adjustably directed clean air supply assembly, as claimed in claim 50, wherein each of the multiple clamping assemblies has one portion thereof secured to the top hood housing and another portion thereof adapted for securement to a grill fitted adjacent to the high efficiency particle arrestor air filter, whereby when the clamping is undertaken, the grill serves to hold and to protect the filter, and the filter gasket is compressed creating the overall seal around the entire installed high efficiency particle arrestor air filter.

52. A rollably positioned, passable through doorways, adjustably directed clean air supply assembly, as claimed in claim 45, wherein the top filter head assembly comprises an addition:

a) a hood top, which has an overall continuous receptacle that is sized to receive the respective wing portions of the filter gasket;

b) a grill fitted adjacent to the high efficiency particle arrestor air filter; and c) multiple clamping subassemblies spaced apart and utilized to secure the grill to the hood top, whereby the grill serves to hold and to protect the filter, and the filter gasket positioned in part in the overall continuous receptacle is compressed creating the overall seal around the then installed high efficiency particle arrestor air filter.

53. A rollably positioned, passable through doorways, adjustably directed clean air supply assembly, as claimed in claim 52, wherein the filter gasket is manufactured to be soft and easily compressible, with the interior being closed cell plastic, and the exterior being an outer smooth sealing skin, thereby allowing for the non-distortion of the top filter head assembly, and allowing for the needed amount of compression of the filter gasket when fitted around the high efficiency particle arrestor air filter, after the multiple clamping subassemblies have been utilized, thereby providing a completely sealed clean air supply system, which, when handled properly and used properly results in the elimination of any requirement of having to go through a recertification test, each time the clean air supply assembly is transported and set up for another usage.

54. A rollably positioned, passable through doorways, adjustably directed clean air supply assembly, as claimed in claim 1, where in the weather controlled environments, are low grade cleanrooms, normal rooms, tents, or vaults whereby weather related items such as rain, wind, and excessive dust are controlled.

55. A rollably positioned, passable through doorways, adjustably directed clean air supply assembly, as claimed in claim 1, comprising, in addition, a surrounding curtain, attached to a hood top of the top filter head assembly, and depending therefrom to provide, in effect, a cleanroom below the top filter head assembly, wherein the filters serve to create a certifiable cleanroom, when shrouded by said certain, governed by strict standards with specifications regarding; airborne particle count, airflow velocity, minimal filter airflow differential, filter contaminate leakage, and outside air interference, and when unshrouded creates a clean zone, which within cleanroom standards is an area that has all of the above restrictions except the outside air specification is relaxed, however good operational practices must still be followed.

56. A rollably positioned, passable through doorways, adjustably directed clean air supply assembly, for use in weather controlled environments to direct clean air through a designated volume of air, where an activity is being undertaken, which requires very clean air per strict specifications, comprising:

a. lower hollow housing having in turn:
  i. a center vertical section of this lower hollow housing; and
  ii. a rear vertical section of this lower hollow housing, which is
  iii. secured to the center vertical section, to provide a positively air sealed interior receiving volume plenum structure for an interior powered air moving assembly and to provide air flow passageways for incoming air to enter this lower hollow housing and to enter the intake of a interior powered air moving assembly, and for air to leave an interior powered air moving assembly and to leave this lower hollow housing;

b. a charcoal pre-filter assembly secured outside to the front of the front vertical section of the lower hollow housing comprising, in turn:
  i. a filter door housing, with intake louvers;
  ii. a charcoal pre-filter fitted within the filter door housing;
  ii. a filter retainer holding the charcoal pre-filter within the filter door housing; and a
  iii. baffle positioned on the front vertical section of the lower hollow housing to redirect air leaving the charcoal pre-filter around this baffle before entering the air flow passageway in the lower hollow housing and continuing on to an intake of an interior powered air moving assembly, whereby the use of the baffle serves to deflect the sound level of an interior powered air moving assembly, and also serves to avoid the channeling of the incoming air through only the central area of the charcoal pre-filter;

c. an interior powered air moving assembly secured inside to the rear vertical section of the lower hollow housing, comprising, in turn:
  i. a mounting structure of the rear vertical section;
  ii. an electric motor shaft secured to this mounting structure;
  iii. an armature secured to this electric motor shaft;
  iv. a backward inclined impeller rotatably positioned about electric motor shaft;
  v. an electrical field secured to this impeller to complete an electrical motor which is thereby positioned inside the backward inclined impeller, and secured to the mounting structure, whereby the backward inclined impeller rotates it to draw air in axially and to discharge air radially;

d. horizontal extending legs secured to the lower hollow housing at the bottom thereof;

e. casters secured to and depending from the legs at the ends thereof;

f. a tower hollow housing having in turn:
  i. a front vertical section of this tower hollow housing; and
  ii. a rear vertical section of this tower hollow housing, which is secured to the top vertical section, and the secured vertical sections provide an interior receiving volume structure which serves as an air flow passageway; and whereas this tower hollow housing receives, in part, a vertically positioned telescoping structural tube plenum, positions a power assembly used in raising and lowering the telescoping structural tube plenum, and positions a control assembly;

g. a power assembly in the tower hollow housing, used in raising and lowering a telescoping structural tube plenum, and thereby raising and lowering a top filter head assembly, having in turn:
  i. an electrical motor;
  ii. a lead screw powered by the electrical motor, and
  iii. a guide block movable on the lead screw and adapted to contact and to move a telescoping structural tube plenum;

h. a control assembly in the tower hollow housing, used in controlling the operation of the electrical motor of the interior powered air moving assembly, and in controlling the operation of the electrical motor of the power assembly used in raising and lowering a telescoping structural tube plenum assembly;

i. a telescoping structural tube plenum assembly movably receivable, in part, in the tower hollow housing for vertical movement by the power assembly upon operations of the control assembly; a tilt adjustment assembly secured in part to the structural tube assembly, comprising in turn:
  i. spaced vertical support arms, having holes, secured to the telescoping structural tube plenum assembly;
  ii. a bolt serving as s shaft to be extended through the holes of spaced vertical support arms;
  iii. a pivot bracket for rotation about the bolt serving as a shaft;
  iv. at least one positioning assembly for moving and holding the pivot bracket to selected angular positions, comprising, in turn, spaced fiber friction plates arranged along the bolt serving as a shaft; spaced steel friction plates located in the spaces between the spaced fiber friction plates and also arranged along the bolt serving as a shaft, with the steel friction plates interfitting with the pivot bracket to rotate with it; a torsion spring having both a coil portion thereof fitted about the bolt, serving as a shaft, and an extending arm for movably contacting all the steel friction plates to restrain them as a group, when this group is frictionally opposing rotary movement of the pivot bracket; a bushing both for positioning about the bolt, serving as a shaft, for receiving, the spaced fiber friction spaced plates and steel friction plates; a mandrel for positioning about the bolt, serving as a shaft, and fitting into the coil portion of the torsion spring; belleville washers serving as conical spring washers fitted about the bushing fitted about the bolt, serving as a shaft, and positioned at the respective sides of the overall grouping of the spaced fiber friction plates and the spaced steel friction plates; compression washers for placement over the bolt, serving as a shaft, and one of them is located between the pivot bracket and one of the spaced support arms, and the other is located between the belleville washer, and one of the spaced steel friction plates; a compression cap for placement over the bolt, serving as a shaft, and located adjacent to one of the belleville washers; a washer for placement over the bolt, serving as a shaft, and located adjacent to the compression cap; a self locking torsion adjustment nut for placement over the bolt, serving as a shaft, and located adjacent the washer to hold together this tilt adjustment assembly, when the assembly thereof about the bolt, serving as a shaft, has been completed, whereby the pivot bracket is controllably adjusted from a vertical position, through selectable angular positions, to a horizontal position;

j. a self sealing bellows for fitting over the tilt adjustment assembly, and secured at the lower end thereof to the telescoping structural tube plenum assembly at the top thereof, and arranged for securement at the top thereof to a top filter head assembly, to thereby direct the pre-filtered air through the interior of this bellows, when this air is flowing between the respective filters; and k. a self sealing bellows for fitting over the tilt adjustment assembly, and secured at the lower end thereof to the telescoping structural tube plenum assembly at the top thereof, and arranged for securement at the top thereof to a top filter head assembly, to thereby direct the pre-filtered air through the interior of this bellows, when this air is flowing between the respective filters; and l. a top filter hood assembly, tiltably secured to the telescoping structural tube plenum assembly, by utilizing the tilt adjustment assembly, and this top filter head assembly comprises: a hood top contoured to receive the pre-filtered air arriving through the bellows and equally distribute this air throughout the hood top, and then directing this final filtered air in a ninety degree direction; a gasketed high efficiency particle arrestor filter fitted partially into the hood top to receive, to filter, and to pass on the final-filtered air; a grill fitted adjacent the high efficiency particle arrestor filter, serving to hold and to protect this filter, and to further disperse the flow of the filtered air; a hood bezel fitted about the grill, and the high efficiency particle arrestor filter, and secured to the hood top, and the bellows at the top thereof is secured to this top filter head assembly.

57. A rollably positioned passable through doorways, adjustably directed clean air supply assembly, as claimed in claim 56, wherein the grill serving to hold and to protect the high efficiency particle arrestor filter is a perforated metal grill having a grounding circuit to conduct away any static electricity, which would otherwise be carried in the clean air flow to a work place, where a static electrical discharge could interfere with the quality of the work being undertaken.

* * * * *